US012550942B2

(12) United States Patent
Blackmon et al.

(10) Patent No.: US 12,550,942 B2
(45) Date of Patent: Feb. 17, 2026

(54) SESSION CONTROL SYSTEM

(71) Applicant: Altria Client Services LLC, Richmond, VA (US)

(72) Inventors: Zack W. Blackmon, Richmond, VA (US); Thomas Tran, Richmond, VA (US); Terry Bache, Richmond, VA (US); Jarrett Keen, Richmond, VA (US); Niall Gallagher, Richmond, VA (US); Yannick Hourmand, Haslingfield (GB); Guillaume Michel, Cambridge (GB); Rangaraj S. Sundar, Midlothian, VA (US); Raymond W. Lau, Glen Allen, VA (US); Eric Hawes, Midlothian, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 517 days.

(21) Appl. No.: 17/947,334

(22) Filed: Sep. 19, 2022

(65) Prior Publication Data
US 2024/0090586 A1 Mar. 21, 2024

(51) Int. Cl.
*A24F 40/53* (2020.01)
*A24F 40/20* (2020.01)
(Continued)

(52) U.S. Cl.
CPC .............. *A24F 40/53* (2020.01); *A24F 40/60* (2020.01); *G08B 6/00* (2013.01)

(58) Field of Classification Search
CPC ........... A24F 40/50; A24F 40/53; A24F 40/60
See application file for complete search history.

(56) References Cited

U.S. PATENT DOCUMENTS 6,810,883 B2  11/2004  Felter et al.
8,550,069 B2  10/2013  Alelov
(Continued)

FOREIGN PATENT DOCUMENTS

EP   1558098 B1   1/2013
EP   2608686 B1   6/2015
(Continued)

OTHER PUBLICATIONS

International Search Report and Written Opinion Corresponding to Application No. PCT/US2023/074557, mailed Feb. 1, 2024.
(Continued)

*Primary Examiner* — Philip Y Louie
*Assistant Examiner* — Charlotte Davison
(74) *Attorney, Agent, or Firm* — Harness, Dickey & Pierce, P.L.C.

(57) ABSTRACT

A session control system for a device includes at least one processor and a memory coupled to the at least one processor. The memory is configured to store instructions. The at least one processor is configured to execute the instructions to cause the session control system to detect when a session has started, start a session timer, increment a puff variable when an airflow sensor detects that a puff has been taken, monitor the session timer against a time threshold and the puff variable against a puff threshold, and in response to a session threshold being met, end the session. The session timer is configured to measure a length of the session and the puff variable corresponds to a total number of puffs taken.

24 Claims, 12 Drawing Sheets

(51) Int. Cl.
  *A24F 40/40* (2020.01)
  *A24F 40/50* (2020.01)
  *A24F 40/60* (2020.01)
  *A61M 15/06* (2006.01)
  *G08B 6/00* (2006.01)

(56) References Cited

U.S. PATENT DOCUMENTS

| | | | |
|---|---|---|---|
| 8,714,150 B2 | 5/2014 | Alelov | |
| 9,072,321 B2 | 7/2015 | Liu | |
| 9,414,629 B2 | 8/2016 | Egoyants et al. | |
| 9,462,832 B2 | 10/2016 | Lord | |
| 9,532,600 B2 | 1/2017 | Thorens et al. | |
| 9,532,605 B2 | 1/2017 | Yamada et al. | |
| 9,655,383 B2 | 5/2017 | Holzherr et al. | |
| 9,801,416 B2 | 10/2017 | Robinson et al. | |
| 9,808,032 B2 | 11/2017 | Yamada et al. | |
| 9,814,268 B2 | 11/2017 | Robinson et al. | |
| 9,872,521 B2 | 1/2018 | Farine et al. | |
| 9,901,123 B2 | 2/2018 | Robinson et al. | |
| 10,021,912 B2 | 7/2018 | Yamada et al. | |
| 10,058,124 B2 | 8/2018 | Monsees et al. | |
| 10,064,434 B2 | 9/2018 | Zitzke et al. | |
| 10,111,465 B2 | 10/2018 | Liu | |
| 10,117,460 B2 | 11/2018 | Sears et al. | |
| 10,130,123 B2 | 11/2018 | Hatton et al. | |
| 10,226,079 B2 | 3/2019 | Robinson et al. | |
| 10,342,263 B2 | 7/2019 | Memari et al. | |
| 10,349,675 B2 | 7/2019 | Choukroun et al. | |
| 10,349,679 B2 | 7/2019 | Memari et al. | |
| 10,349,680 B2 | 7/2019 | Memari et al. | |
| 10,349,681 B2 | 7/2019 | Memari et al. | |
| 10,357,062 B2 | 7/2019 | Memari et al. | |
| 10,362,807 B2 | 7/2019 | Memari et al. | |
| 10,362,808 B2 | 7/2019 | Memari et al. | |
| 10,368,583 B2 | 8/2019 | Takeuchi et al. | |
| 10,368,585 B2 | 8/2019 | Memari et al. | |
| 10,375,990 B2 | 8/2019 | Lord | |
| 10,375,998 B2 | 8/2019 | Memari et al. | |
| 10,398,175 B2 | 9/2019 | Thorens | |
| 10,420,373 B2 | 9/2019 | Alelov | |
| 10,420,374 B2 | 9/2019 | Liu | |
| 10,433,589 B2 | 10/2019 | Zitzke et al. | |
| 10,448,670 B2 | 10/2019 | Talon et al. | |
| 10,463,079 B2 | 11/2019 | Memari et al. | |
| 10,499,691 B2 | 12/2019 | Takeuchi et al. | |
| 10,517,530 B2 | 12/2019 | Cohen | |
| 10,531,688 B2 | 1/2020 | Oishi | |
| 10,537,135 B2 | 1/2020 | Smith et al. | |
| 10,609,956 B2 | 4/2020 | Takeuchi et al. | |
| 10,617,150 B2 | 4/2020 | Cameron | |
| 10,645,971 B2 | 5/2020 | Zitzke | |
| 10,661,035 B2 | 5/2020 | Freeman et al. | |
| 10,667,559 B2 | 6/2020 | Bessant et al. | |
| 10,674,770 B2 | 6/2020 | Talon | |
| 10,716,329 B2 | 7/2020 | Matsumoto et al. | |
| 10,753,974 B2 | 8/2020 | Novak, III et al. | |
| 10,758,688 B1 | 9/2020 | Yamada et al. | |
| 10,779,568 B2 | 9/2020 | Smith et al. | |
| 10,856,571 B2 | 12/2020 | Bessant et al. | |
| 10,856,577 B2 | 12/2020 | Smith et al. | |
| 10,863,773 B2 | 12/2020 | Suzuki et al. | |
| 10,869,503 B2 * | 12/2020 | Yamada | A24F 40/50 |
| 10,874,149 B2 | 12/2020 | Lord | |
| 10,881,131 B2 | 1/2021 | Matsumoto et al. | |
| 10,912,335 B2 | 2/2021 | Zitzke | |
| 10,925,318 B2 | 2/2021 | Martzel | |
| 10,980,283 B2 | 4/2021 | Alelov | |
| 11,013,269 B2 | 5/2021 | Alarcon et al. | |
| 11,051,558 B2 | 7/2021 | Tu | |
| 11,075,995 B2 | 7/2021 | Woodbine et al. | |
| 11,083,226 B2 | 8/2021 | Yamada et al. | |
| 11,089,818 B2 | 8/2021 | Fuisz et al. | |
| 11,103,011 B2 | 8/2021 | Liu | |
| 11,129,418 B2 | 9/2021 | Lord | |
| 11,140,922 B2 | 10/2021 | Mizuguchi et al. | |
| 11,147,316 B2 | 10/2021 | Farine et al. | |
| 11,154,095 B2 | 10/2021 | Alarcon et al. | |
| 11,160,311 B2 | 11/2021 | Akao et al. | |
| 11,166,495 B2 | 11/2021 | Cohen | |
| 11,185,648 B2 | 11/2021 | Hon et al. | |
| 11,219,723 B2 | 1/2022 | Alelov | |
| 11,253,006 B2 | 2/2022 | Memari et al. | |
| 11,259,565 B2 | 3/2022 | Glaser et al. | |
| 11,266,180 B2 | 3/2022 | Peleg et al. | |
| 11,278,051 B2 | 3/2022 | Zhao | |
| 11,350,669 B2 | 6/2022 | Quintana | |
| 11,363,682 B2 | 6/2022 | Mironov et al. | |
| 11,388,933 B2 | 7/2022 | Choukroun et al. | |
| 11,395,515 B2 | 7/2022 | Talon | |
| 11,412,579 B2 | 8/2022 | Takeuchi et al. | |
| 11,432,590 B2 | 9/2022 | Yamada et al. | |
| 11,439,184 B2 | 9/2022 | Bowen et al. | |
| 11,439,188 B2 | 9/2022 | Lin et al. | |
| 11,445,761 B2 | 9/2022 | Fu | |
| 11,445,763 B2 | 9/2022 | Yamada et al. | |
| 11,460,334 B2 | 10/2022 | Colotte et al. | |
| 11,501,652 B2 | 11/2022 | Gamygin et al. | |
| 11,547,146 B2 | 1/2023 | Nakano et al. | |
| 11,553,736 B2 | 1/2023 | Borkovec et al. | |
| 11,576,436 B2 | 2/2023 | Moloney et al. | |
| 11,583,006 B2 | 2/2023 | Wen | |
| 11,583,008 B2 | 2/2023 | Hong et al. | |
| 11,596,182 B2 | 3/2023 | Lee et al. | |
| 11,612,184 B2 | 3/2023 | Cadieux et al. | |
| 11,622,582 B2 | 4/2023 | Lim et al. | |
| 11,627,759 B2 | 4/2023 | Han et al. | |
| 11,633,555 B2 | 4/2023 | Katayama et al. | |
| 11,633,557 B2 | 4/2023 | Katayama et al. | |
| 11,638,447 B2 | 5/2023 | Yamada et al. | |
| 11,641,871 B2 | 5/2023 | Robinson et al. | |
| 11,647,781 B2 | 5/2023 | Robinson et al. | |
| 11,647,793 B2 | 5/2023 | Lord | |
| 11,666,102 B2 | 6/2023 | Jung et al. | |
| 11,684,088 B2 | 6/2023 | Liu | |
| 11,696,604 B2 | 7/2023 | Henry, Jr. et al. | |
| 11,696,988 B2 | 7/2023 | Mizuguchi et al. | |
| 11,701,482 B2 | 7/2023 | Lord | |
| 11,707,583 B2 | 7/2023 | Garcia et al. | |
| 11,710,848 B2 | 7/2023 | Otiaba | |
| 2004/0031497 A1* | 2/2004 | Likness | A24F 40/51 |
| | | | 131/270 |
| 2012/0048266 A1* | 3/2012 | Alelov | A61M 11/005 |
| | | | 128/203.14 |
| 2015/0053214 A1* | 2/2015 | Alarcon | A24F 40/95 |
| | | | 131/273 |
| 2015/0136158 A1 | 5/2015 | Stevens et al. | |
| 2015/0257445 A1 | 9/2015 | Henry, Jr. et al. | |
| 2017/0238610 A1 | 8/2017 | Reevell | |
| 2018/0077971 A1 | 3/2018 | Katayama et al. | |
| 2019/0053540 A1 | 2/2019 | Baker et al. | |
| 2019/0087302 A1 | 3/2019 | Smith et al. | |
| 2019/0183185 A1 | 6/2019 | Manas et al. | |
| 2019/0373959 A1 | 12/2019 | Nakano et al. | |
| 2019/0380389 A1 | 12/2019 | Hong et al. | |
| 2019/0387796 A1 | 12/2019 | Cohen | |
| 2019/0387804 A1 | 12/2019 | Liu | |
| 2020/0000143 A1 | 1/2020 | Anderson et al. | |
| 2020/0009336 A1 | 1/2020 | Feng | |
| 2020/0085097 A1 | 3/2020 | Smith et al. | |
| 2020/0152301 A1 | 5/2020 | Alarcon et al. | |
| 2020/0178599 A1 | 6/2020 | Worm et al. | |
| 2020/0197634 A1 | 6/2020 | Mizuguchi et al. | |
| 2020/0205476 A1 | 7/2020 | Wen | |
| 2020/0236995 A1 | 7/2020 | Zhou et al. | |
| 2020/0281277 A1 | 9/2020 | Akao et al. | |
| 2020/0282156 A1 | 9/2020 | Potter et al. | |
| 2020/0315253 A1 | 10/2020 | Legendy et al. | |
| 2020/0323268 A1 | 10/2020 | Thorens et al. | |
| 2020/0337382 A1 | 10/2020 | Sur | |
| 2020/0338285 A1 | 10/2020 | Yamada et al. | |
| 2020/0352250 A1 | 11/2020 | Wood et al. | |
| 2020/0359681 A1 | 11/2020 | Han et al. | |
| 2020/0383377 A1 | 12/2020 | Chong et al. | |

(56) References Cited

U.S. PATENT DOCUMENTS

| | | |
|---|---|---|
| 2020/0390158 A1 | 12/2020 | Hepworth et al. |
| 2020/0404971 A1 | 12/2020 | Jung et al. |
| 2021/0007402 A1 | 1/2021 | Qiu et al. |
| 2021/0007413 A1 | 1/2021 | Moloney et al. |
| 2021/0015156 A1 | 1/2021 | Woodbine et al. |
| 2021/0015165 A1 | 1/2021 | He |
| 2021/0037891 A1 | 2/2021 | Fard et al. |
| 2021/0059314 A1 | 3/2021 | Talbot et al. |
| 2021/0068456 A1 | 3/2021 | Bessant et al. |
| 2021/0068464 A1 | 3/2021 | Lauenstein et al. |
| 2021/0076747 A1 | 3/2021 | Alarcon |
| 2021/0084973 A1 | 3/2021 | Alvarez |
| 2021/0089946 A1 | 3/2021 | Pegors et al. |
| 2021/0093015 A1 | 4/2021 | Lord |
| 2021/0127748 A1 | 5/2021 | Lim et al. |
| 2021/0137172 A1 | 5/2021 | Otiaba |
| 2021/0138166 A1 | 5/2021 | Garcia et al. |
| 2021/0145066 A1 | 5/2021 | Bilat et al. |
| 2021/0145070 A1 | 5/2021 | Bilat et al. |
| 2021/0153561 A1 | 5/2021 | Worm et al. |
| 2021/0154420 A1 | 5/2021 | Jorgensen et al. |
| 2021/0161213 A1 | 6/2021 | Woodbine et al. |
| 2021/0177054 A1 | 6/2021 | Zitzke |
| 2021/0177066 A1 | 6/2021 | Li |
| 2021/0219621 A1 | 7/2021 | Parrott et al. |
| 2021/0219622 A1 | 7/2021 | Parrott et al. |
| 2021/0227892 A1 | 7/2021 | Leah et al. |
| 2021/0235766 A1 | 8/2021 | Tope |
| 2021/0243844 A1 | 8/2021 | Reevell |
| 2021/0244076 A1 | 8/2021 | Ferrie et al. |
| 2021/0244083 A1 | 8/2021 | Lord et al. |
| 2021/0260308 A1 | 8/2021 | Marsot et al. |
| 2021/0282465 A1 | 9/2021 | Cristian |
| 2021/0289845 A1 | 9/2021 | Silvestrini et al. |
| 2021/0297489 A1 | 9/2021 | Woodbine et al. |
| 2021/0307404 A1 | 10/2021 | Shafer |
| 2021/0308392 A1 | 10/2021 | Alarcon et al. |
| 2021/0313029 A1 | 10/2021 | Emmett et al. |
| 2021/0337876 A1 | 11/2021 | Serita et al. |
| 2021/0337878 A1 | 11/2021 | Gretton et al. |
| 2021/0345680 A1 | 11/2021 | Liu |
| 2021/0378316 A1 | 12/2021 | Hashimoto |
| 2021/0386122 A1 | 12/2021 | Lord |
| 2021/0401057 A1 | 12/2021 | Chen et al. |
| 2022/0007738 A1 | 1/2022 | Nakano et al. |
| 2022/0015439 A1 | 1/2022 | Gallagher et al. |
| 2022/0015440 A1 | 1/2022 | Gallagher et al. |
| 2022/0015444 A1 | 1/2022 | Liu |
| 2022/0015447 A1 | 1/2022 | Gallagher et al. |
| 2022/0022549 A1 | 1/2022 | Lin et al. |
| 2022/0039480 A1 | 2/2022 | Cho et al. |
| 2022/0047819 A1 | 2/2022 | Wilson et al. |
| 2022/0053837 A1 | 2/2022 | Cohen |
| 2022/0061399 A1 | 3/2022 | Ferrie et al. |
| 2022/0071295 A1 | 3/2022 | Strophair et al. |
| 2022/0079239 A1 | 3/2022 | Lim, II et al. |
| 2022/0079244 A1 | 3/2022 | Yamada et al. |
| 2022/0088321 A1 | 3/2022 | Alelov |
| 2022/0095688 A1 | 3/2022 | Talbot et al. |
| 2022/0095690 A1 | 3/2022 | Marubashi |
| 2022/0095692 A1 | 3/2022 | Ferrie et al. |
| 2022/0095697 A1 | 3/2022 | Greenbaum |
| 2022/0104545 A1 | 4/2022 | Alsayar et al. |
| 2022/0125124 A1 | 4/2022 | Cho et al. |
| 2022/0160050 A1 | 5/2022 | Carlson et al. |
| 2022/0180769 A1 | 6/2022 | Pandolfino |
| 2022/0183377 A1 | 6/2022 | Blandino et al. |
| 2022/0183382 A1 | 6/2022 | Lee et al. |
| 2022/0183385 A1 | 6/2022 | Yilmaz et al. |
| 2022/0183392 A1 | 6/2022 | Beidelman |
| 2022/0211113 A1 | 7/2022 | Ruscio et al. |
| 2022/0218021 A1 | 7/2022 | Peleg et al. |
| 2022/0225669 A1 | 7/2022 | Hawes et al. |
| 2022/0225685 A1 | 7/2022 | Blackmon |
| 2022/0232900 A1 | 7/2022 | Bilat et al. |
| 2022/0240579 A1 | 8/2022 | Czapar et al. |
| 2022/0248503 A1 | 8/2022 | Mironov et al. |
| 2022/0256907 A1 | 8/2022 | Robinson et al. |
| 2022/0256930 A1 | 8/2022 | Thomas et al. |
| 2022/0273041 A1 | 9/2022 | Quintana |
| 2022/0273042 A1 | 9/2022 | Lee et al. |
| 2022/0287368 A1 | 9/2022 | Garcia-Doty |
| 2022/0287373 A1 | 9/2022 | Lin et al. |
| 2022/0322746 A1 | 10/2022 | Talon |
| 2022/0330609 A1 | 10/2022 | Xie |
| 2022/0346458 A1 | 11/2022 | Zominy |
| 2022/0361583 A1 | 11/2022 | Lee et al. |
| 2022/0361585 A1 | 11/2022 | Moloney et al. |
| 2022/0361586 A1 | 11/2022 | Moloney et al. |
| 2022/0369721 A1 | 11/2022 | Choukroun et al. |
| 2022/0378095 A1 | 12/2022 | Bowen et al. |
| 2022/0378108 A1 | 12/2022 | Cho et al. |
| 2022/0395028 A1 | 12/2022 | Lee et al. |
| 2022/0400765 A1 | 12/2022 | Capuano |
| 2023/0000166 A1 | 1/2023 | Lee et al. |
| 2023/0000168 A1 | 1/2023 | Moloney |
| 2023/0000172 A1 | 1/2023 | Tezuka et al. |
| 2023/0010449 A1 | 1/2023 | Rogan et al. |
| 2023/0010695 A1 | 1/2023 | Benning et al. |
| 2023/0014618 A1 | 1/2023 | Nelson |
| 2023/0020117 A1 | 1/2023 | Takeuchi et al. |
| 2023/0023805 A1 | 1/2023 | Jacobs, Jr. et al. |
| 2023/0024870 A1 | 1/2023 | Colotte et al. |
| 2023/0036662 A1 | 2/2023 | Tran |
| 2023/0038544 A1 | 2/2023 | Oliana |
| 2023/0052593 A1 | 2/2023 | Jung et al. |
| 2023/0062580 A1 | 3/2023 | Moloney et al. |
| 2023/0072356 A1 | 3/2023 | Yamada |
| 2023/0083064 A1 | 3/2023 | Yamada |
| 2023/0088267 A1 | 3/2023 | Eissenberg et al. |
| 2023/0095659 A1 | 3/2023 | Lee et al. |
| 2023/0096488 A1 | 3/2023 | Akao et al. |
| 2023/0096818 A1 | 3/2023 | Nakano |
| 2023/0102855 A1 | 3/2023 | Fujita et al. |
| 2023/0109789 A1 | 4/2023 | Nakano et al. |
| 2023/0109861 A1 | 4/2023 | Cho et al. |
| 2023/0119000 A1 | 4/2023 | Borkovec et al. |
| 2023/0120779 A1 | 4/2023 | Wen et al. |
| 2023/0121005 A1 | 4/2023 | Danek et al. |
| 2023/0126544 A1 | 4/2023 | Goldschmidtböing et al. |
| 2023/0144873 A1 | 5/2023 | Lakraa |
| 2023/0157370 A1 | 5/2023 | Moloney et al. |
| 2023/0157373 A1 | 5/2023 | Garcia-Doty et al. |
| 2023/0161367 A1 | 5/2023 | Xie et al. |
| 2023/0165313 A1 | 6/2023 | Lee et al. |
| 2023/0166055 A1 | 6/2023 | Atkins et al. |
| 2023/0166060 A1 | 6/2023 | Bowen et al. |
| 2023/0172279 A1 | 6/2023 | Moloney et al. |
| 2023/0180826 A1 | 6/2023 | Murison et al. |
| 2023/0189885 A1 | 6/2023 | Yamada et al. |
| 2023/0189894 A1 | 6/2023 | Ohri et al. |
| 2023/0225398 A1 | 7/2023 | Cadieux et al. |
| 2023/0232886 A1 | 7/2023 | Robinson et al. |
| 2023/0233779 A1 | 7/2023 | Lord |
| 2023/0248067 A1 | 8/2023 | Smith et al. |
| 2023/0354912 A1* | 11/2023 | Rosser .................. A24F 40/51 |

FOREIGN PATENT DOCUMENTS

| | | |
|---|---|---|
| EP | 2477514 B1 | 9/2016 |
| EP | 3085250 A1 | 10/2016 |
| EP | 2967156 B1 | 11/2016 |
| EP | 3138425 A1 | 3/2017 |
| EP | 2797447 B1 | 7/2017 |
| EP | 2083643 B1 | 9/2017 |
| EP | 3266322 A1 | 1/2018 |
| EP | 3039974 B1 | 4/2018 |
| EP | 2856893 B1 | 6/2018 |
| EP | 3042576 B1 | 6/2018 |
| EP | 3145342 B1 | 7/2018 |
| EP | 3316714 B1 | 11/2018 |
| EP | 2908675 B1 | 1/2019 |
| EP | 3443856 A1 | 2/2019 |
| EP | 2645892 B1 | 3/2019 |

(56) References Cited

FOREIGN PATENT DOCUMENTS

| | | |
|---|---|---|
| EP | 2835063 B1 | 4/2019 |
| EP | 2967145 B1 | 5/2019 |
| EP | 3116334 B1 | 6/2019 |
| EP | 2915443 B1 | 8/2019 |
| EP | 3085251 B1 | 9/2019 |
| EP | 3536179 A1 | 9/2019 |
| EP | 3138422 B1 | 10/2019 |
| EP | 3229622 B1 | 10/2019 |
| EP | 3556230 A2 | 10/2019 |
| EP | 3563697 A1 | 11/2019 |
| EP | 3138423 B1 | 1/2020 |
| EP | 3603426 A1 | 2/2020 |
| EP | 3610740 A2 | 2/2020 |
| EP | 3610741 A1 | 2/2020 |
| EP | 3610742 A2 | 2/2020 |
| EP | 3610743 A2 | 2/2020 |
| EP | 3610745 A1 | 2/2020 |
| EP | 3610746 A2 | 2/2020 |
| EP | 3610747 A2 | 2/2020 |
| EP | 3610748 A1 | 2/2020 |
| EP | 3622838 A2 | 3/2020 |
| EP | 3626088 A1 | 3/2020 |
| EP | 3416506 B1 | 4/2020 |
| EP | 3632238 A1 | 4/2020 |
| EP | 3632240 A1 | 4/2020 |
| EP | 3632243 A1 | 4/2020 |
| EP | 3145347 B1 | 5/2020 |
| EP | 3222159 B1 | 6/2020 |
| EP | 3508082 B1 | 6/2020 |
| EP | 3666094 A1 | 6/2020 |
| EP | 3666095 A2 | 6/2020 |
| EP | 3669677 A1 | 6/2020 |
| EP | 3669678 A2 | 6/2020 |
| EP | 3673752 A1 | 7/2020 |
| EP | 3679813 A1 | 7/2020 |
| EP | 3679814 A1 | 7/2020 |
| EP | 3689160 A1 | 8/2020 |
| EP | 3251529 B1 | 9/2020 |
| EP | 3272382 B1 | 9/2020 |
| EP | 3704962 A1 | 9/2020 |
| EP | 3704963 A2 | 9/2020 |
| EP | 3704964 A2 | 9/2020 |
| EP | 3704965 A2 | 9/2020 |
| EP | 3704966 A2 | 9/2020 |
| EP | 3704967 A2 | 9/2020 |
| EP | 3704968 A2 | 9/2020 |
| EP | 3704969 A2 | 9/2020 |
| EP | 3704970 A2 | 9/2020 |
| EP | 3704971 A2 | 9/2020 |
| EP | 3704972 A2 | 9/2020 |
| EP | 3704973 A2 | 9/2020 |
| EP | 3704974 A2 | 9/2020 |
| EP | 3708012 A2 | 9/2020 |
| EP | 3709828 A1 | 9/2020 |
| EP | 3711500 A1 | 9/2020 |
| EP | 3711502 A1 | 9/2020 |
| EP | 3711510 A1 | 9/2020 |
| EP | 3711514 A1 | 9/2020 |
| EP | 3711515 A1 | 9/2020 |
| EP | 3711516 A1 | 9/2020 |
| EP | 3711521 A1 | 9/2020 |
| EP | 3711524 A1 | 9/2020 |
| EP | 3711531 A1 | 9/2020 |
| EP | 3711542 A1 | 9/2020 |
| EP | 3711560 A1 | 9/2020 |
| EP | 3711564 A1 | 9/2020 |
| EP | 3711567 A1 | 9/2020 |
| EP | 3711578 A1 | 9/2020 |
| EP | 3711580 A1 | 9/2020 |
| EP | 3711584 A1 | 9/2020 |
| EP | 3711585 A1 | 9/2020 |
| EP | 3711587 A1 | 9/2020 |
| EP | 3711588 A1 | 9/2020 |
| EP | 3711589 A1 | 9/2020 |
| EP | 3711590 A1 | 9/2020 |
| EP | 3711643 A1 | 9/2020 |
| EP | 3729983 A1 | 10/2020 |
| EP | 3275324 B1 | 11/2020 |
| EP | 3741226 A1 | 11/2020 |
| EP | 3071273 B1 | 12/2020 |
| EP | 3488715 B1 | 12/2020 |
| EP | 3750412 A2 | 12/2020 |
| EP | 3750413 A2 | 12/2020 |
| EP | 3750414 A2 | 12/2020 |
| EP | 3750415 A2 | 12/2020 |
| EP | 3750416 A2 | 12/2020 |
| EP | 3750417 A1 | 12/2020 |
| EP | 3750418 A1 | 12/2020 |
| EP | 3753423 A1 | 12/2020 |
| EP | 3260002 B1 | 1/2021 |
| EP | 3758523 A1 | 1/2021 |
| EP | 3758524 A1 | 1/2021 |
| EP | 3759589 A1 | 1/2021 |
| EP | 3759890 A1 | 1/2021 |
| EP | 3759898 A1 | 1/2021 |
| EP | 3759899 A1 | 1/2021 |
| EP | 3759900 A1 | 1/2021 |
| EP | 3759901 A1 | 1/2021 |
| EP | 3759902 A1 | 1/2021 |
| EP | 3759903 A1 | 1/2021 |
| EP | 3273809 B1 | 2/2021 |
| EP | 3777586 A1 | 2/2021 |
| EP | 3348154 B1 | 3/2021 |
| EP | 3062643 B1 | 4/2021 |
| EP | 3807751 A1 | 4/2021 |
| EP | 3808196 A1 | 4/2021 |
| EP | 3817797 A1 | 5/2021 |
| EP | 3818867 A1 | 5/2021 |
| EP | 3824748 A1 | 5/2021 |
| EP | 3826486 A2 | 6/2021 |
| EP | 3831225 A1 | 6/2021 |
| EP | 3508083 B1 | 7/2021 |
| EP | 3863452 A1 | 8/2021 |
| EP | 3864979 A1 | 8/2021 |
| EP | 3868230 A2 | 8/2021 |
| EP | 3869503 A1 | 8/2021 |
| EP | 3871527 A1 | 9/2021 |
| EP | 3878296 A1 | 9/2021 |
| EP | 3884791 A2 | 9/2021 |
| EP | 3886617 A1 | 10/2021 |
| EP | 3900553 A1 | 10/2021 |
| EP | 3900554 A1 | 10/2021 |
| EP | 3901893 A1 | 10/2021 |
| EP | 3289894 B1 | 11/2021 |
| EP | 3563698 B1 | 11/2021 |
| EP | 3932225 A1 * | 1/2022 ............. A24F 40/20 |
| EP | 3935969 A1 | 1/2022 |
| EP | 3940534 A1 | 1/2022 |
| EP | 3941222 A1 | 1/2022 |
| EP | 3941224 A1 | 1/2022 |
| EP | 3941239 A1 | 1/2022 |
| EP | 3941240 A1 | 1/2022 |
| EP | 3941243 A1 | 1/2022 |
| EP | 3941247 A1 | 1/2022 |
| EP | 3941262 A1 | 1/2022 |
| EP | 3941263 A1 | 1/2022 |
| EP | 3941264 A1 | 1/2022 |
| EP | 3941265 A1 | 1/2022 |
| EP | 3941266 A1 | 1/2022 |
| EP | 3941270 A1 | 1/2022 |
| EP | 3941272 A1 | 1/2022 |
| EP | 3941275 A1 | 1/2022 |
| EP | 3942667 A1 | 1/2022 |
| EP | 3542656 B1 | 2/2022 |
| EP | 3817608 B1 | 4/2022 |
| EP | 3981265 A1 | 4/2022 |
| EP | 3984393 A1 | 4/2022 |
| EP | 3986178 A1 | 4/2022 |
| EP | 3987949 A1 | 4/2022 |
| EP | 3987955 A1 | 4/2022 |
| EP | 3987956 A1 | 4/2022 |
| EP | 3610744 B1 | 5/2022 |
| EP | 3991577 A2 | 5/2022 |
| EP | 3991578 A2 | 5/2022 |

(56) References Cited

FOREIGN PATENT DOCUMENTS

| | | | |
|---|---|---|---|
| EP | 3991579 A2 | 5/2022 |
| EP | 3995018 A1 | 5/2022 |
| EP | 3995019 A1 | 5/2022 |
| EP | 3997993 A1 | 5/2022 |
| EP | 3932225 B1 | 6/2022 |
| EP | 4008204 A1 | 6/2022 |
| EP | 4014765 A1 | 6/2022 |
| EP | 4014766 A1 | 6/2022 |
| EP | 4014769 A1 | 6/2022 |
| EP | 4014772 A1 | 6/2022 |
| EP | 4017291 A1 | 6/2022 |
| EP | 4018855 A1 | 6/2022 |
| EP | 3485747 B1 | 7/2022 |
| EP | 3801084 B1 | 7/2022 |
| EP | 4023088 A1 | 7/2022 |
| EP | 4025083 A1 | 7/2022 |
| EP | 3548128 B1 | 8/2022 |
| EP | 4039110 A1 | 8/2022 |
| EP | 4044849 A1 | 8/2022 |
| EP | 4059552 A1 | 9/2022 |
| EP | 3481474 B1 | 10/2022 |
| EP | 3544453 B1 | 10/2022 |
| EP | 3571941 B1 | 10/2022 |
| EP | 4064902 A1 | 10/2022 |
| EP | 4074204 A1 | 10/2022 |
| EP | 3817597 B1 | 11/2022 |
| EP | 4084270 A1 | 11/2022 |
| EP | 3759897 B1 | 12/2022 |
| EP | 4101321 A1 | 12/2022 |
| EP | 4108110 A1 | 12/2022 |
| EP | 4108112 A1 | 12/2022 |
| EP | 3503750 B1 | 1/2023 |
| EP | 4111883 A1 | 1/2023 |
| EP | 4111890 A1 | 1/2023 |
| EP | 4118989 A1 | 1/2023 |
| EP | 4122334 A1 | 1/2023 |
| EP | 4122340 A1 | 1/2023 |
| EP | 3701817 B1 | 2/2023 |
| EP | 3900553 B1 | 2/2023 |
| EP | 4125468 A1 | 2/2023 |
| EP | 4136733 A1 | 2/2023 |
| EP | 3811801 B1 | 3/2023 |
| EP | 3864987 B1 | 3/2023 |
| EP | 3892127 B1 | 3/2023 |
| EP | 4144244 A1 | 3/2023 |
| EP | 4147594 A1 | 3/2023 |
| EP | 3236787 B1 | 4/2023 |
| EP | 3756486 B1 | 4/2023 |
| EP | 4159066 A1 | 4/2023 |
| EP | 4166019 A1 | 4/2023 |
| EP | 4169404 A1 | 4/2023 |
| EP | 3138425 B1 | 5/2023 |
| EP | 3854236 B1 | 5/2023 |
| EP | 3855961 B1 | 5/2023 |
| EP | 3958696 B1 | 5/2023 |
| EP | 4171288 A1 | 5/2023 |
| EP | 4171291 A1 | 5/2023 |
| EP | 4171292 A1 | 5/2023 |
| EP | 4171293 A1 | 5/2023 |
| EP | 4176745 A1 | 5/2023 |
| EP | 4179891 A1 | 5/2023 |
| EP | 4181712 A1 | 5/2023 |
| EP | 4181713 A1 | 5/2023 |
| EP | 4183282 A1 | 5/2023 |
| EP | 3493869 B1 | 6/2023 |
| EP | 3711510 B1 | 6/2023 |
| EP | 3729980 B1 | 6/2023 |
| EP | 3808198 B1 | 6/2023 |
| EP | 3826486 B1 | 6/2023 |
| EP | 4190190 A1 | 6/2023 |
| EP | 4190193 A1 | 6/2023 |
| EP | 4193859 A1 | 6/2023 |
| EP | 4197359 A1 | 6/2023 |
| EP | 4197372 A1 | 6/2023 |
| EP | 4197373 A1 | 6/2023 |
| EP | 3723452 B1 | 7/2023 |
| EP | 3864986 B1 | 7/2023 |
| EP | 3939450 B1 | 7/2023 |
| EP | 3939452 B1 | 7/2023 |
| EP | 3968796 B1 | 7/2023 |
| EP | 3972435 B1 | 7/2023 |
| EP | 4209138 A1 | 7/2023 |
| EP | 4212038 A1 | 7/2023 |
| EP | 4212039 A1 | 7/2023 |
| EP | 4212040 A1 | 7/2023 |
| EP | 4212043 A1 | 7/2023 |
| EP | 4212045 A1 | 7/2023 |
| GB | 2589213 B | 8/2022 |
| WO | 201756103 A1 | 4/2017 |
| WO | WO-2017191143 A2 | 11/2017 |
| WO | 2019156382 A1 | 8/2019 |
| WO | WO-2019243464 A1 | 12/2019 |
| WO | WO-2020006109 A1 | 1/2020 |
| WO | WO-2020009410 A1 | 1/2020 |
| WO | WO-2020009457 A1 | 1/2020 |
| WO | WO-2020021115 A2 | 1/2020 |
| WO | 2020024154 A1 | 2/2020 |
| WO | 2020193225 A1 | 10/2020 |
| WO | 2020193230 A1 | 10/2020 |
| WO | WO-2020193170 A2 | 10/2020 |
| WO | WO-2020193172 A1 | 10/2020 |
| WO | WO-2020193187 A1 | 10/2020 |
| WO | 2020234883 A1 | 11/2020 |
| WO | WO-2020222497 A1 | 11/2020 |
| WO | WO-2020234166 A1 | 11/2020 |
| WO | WO-2021020768 A1 | 2/2021 |
| WO | 202174580 A1 | 4/2021 |
| WO | 202174581 A1 | 4/2021 |
| WO | WO-2021060716 A1 | 4/2021 |
| WO | 2021122693 A1 | 6/2021 |
| WO | 2021/140112 A1 | 7/2021 |
| WO | 2021128071 A1 | 7/2021 |
| WO | 2021142531 A1 | 7/2021 |
| WO | 2021156365 A1 | 8/2021 |
| WO | 2021165643 A1 | 8/2021 |
| WO | WO-2021157842 A1 | 8/2021 |
| WO | WO-2021157846 A1 | 8/2021 |
| WO | WO-2021162236 A1 | 8/2021 |
| WO | 2021179821 A1 | 9/2021 |
| WO | 2021185740 A1 | 9/2021 |
| WO | 2021185975 A1 | 9/2021 |
| WO | WO-2021214051 A1 | 10/2021 |
| WO | 2021224617 A1 | 11/2021 |
| WO | 2021250086 A1 | 12/2021 |
| WO | 2021260344 A1 | 12/2021 |
| WO | 2021260345 A1 | 12/2021 |
| WO | 2021260346 A1 | 12/2021 |
| WO | 2021260347 A1 | 12/2021 |
| WO | 2022/013386 A1 | 1/2022 |
| WO | 22013383 A2 | 1/2022 |
| WO | 22013395 A2 | 1/2022 |
| WO | 22015456 A1 | 1/2022 |
| WO | 202203070 A1 | 1/2022 |
| WO | 202208897 A1 | 1/2022 |
| WO | 202208898 A1 | 1/2022 |
| WO | 202208899 A1 | 1/2022 |
| WO | 202213059 A1 | 1/2022 |
| WO | 2022003068 A1 | 1/2022 |
| WO | WO-2022003072 A1 | 1/2022 |
| WO | WO-2022013060 A1 | 1/2022 |
| WO | WO-2022014979 A1 | 1/2022 |
| WO | WO-2022020579 A1 | 1/2022 |
| WO | 202232758 A1 | 2/2022 |
| WO | 202232760 A1 | 2/2022 |
| WO | 202258726 A1 | 3/2022 |
| WO | 202258728 A1 | 3/2022 |
| WO | WO-2022045605 A1 | 3/2022 |
| WO | WO-2022045612 A1 | 3/2022 |
| WO | WO-2022049157 A1 | 3/2022 |
| WO | WO-2022049158 A1 | 3/2022 |
| WO | 202269728 A1 | 4/2022 |
| WO | WO-2022074544 A1 | 4/2022 |
| WO | 2022/101955 A1 | 5/2022 |
| WO | WO-2022101954 A1 | 5/2022 |

(56) References Cited

FOREIGN PATENT DOCUMENTS

| | | |
|---|---|---|
| WO | 2022/139329 A1 | 6/2022 |
| WO | 2022133611 A1 | 6/2022 |
| WO | WO-2022117566 A1 | 6/2022 |
| WO | 2022158775 A1 | 7/2022 |
| WO | WO-2022149808 A1 | 7/2022 |
| WO | WO-2022157156 A1 | 7/2022 |
| WO | 2022175449 A1 | 8/2022 |
| WO | WO-2022169174 A1 | 8/2022 |
| WO | WO-2022203188 A1 | 9/2022 |
| WO | 2022/255622 A1 | 12/2022 |
| WO | 2022/270797 A1 | 12/2022 |
| WO | 2022/270798 A1 | 12/2022 |
| WO | 2022255628 A1 | 12/2022 |
| WO | 2022260369 A1 | 12/2022 |
| WO | 2022267806 A1 | 12/2022 |
| WO | WO-2022249235 A1 | 12/2022 |
| WO | WO-2022249445 A1 | 12/2022 |
| WO | 2023/277375 A1 | 1/2023 |
| WO | 202301981 A1 | 1/2023 |
| WO | 2023001981 A1 | 1/2023 |
| WO | 2023274971 A1 | 1/2023 |
| WO | 2023285554 A1 | 1/2023 |
| WO | 2023/004676 A1 | 2/2023 |
| WO | 2023/021546 A1 | 2/2023 |
| WO | 202306416 A1 | 2/2023 |
| WO | 202316031 A1 | 2/2023 |
| WO | 2023/029866 A1 | 3/2023 |
| WO | 2023/029867 A1 | 3/2023 |
| WO | 2023/029941 A1 | 3/2023 |
| WO | 2023/029950 A1 | 3/2023 |
| WO | 2023/046487 A1 | 3/2023 |
| WO | 202327365 A1 | 3/2023 |
| WO | 202349190 A1 | 3/2023 |
| WO | 2023037445 A1 | 3/2023 |
| WO | 2023/053201 A1 | 4/2023 |
| WO | 2023/057572 A1 | 4/2023 |
| WO | 2023/062788 A1 | 4/2023 |
| WO | 2023/068638 A1 | 4/2023 |
| WO | 2023/068639 A1 | 4/2023 |
| WO | 2023/068783 A1 | 4/2023 |
| WO | 2023/068800 A1 | 4/2023 |
| WO | 202350925 A1 | 4/2023 |
| WO | 202351729 A1 | 4/2023 |
| WO | 202353183 A1 | 4/2023 |
| WO | 202358741 A1 | 4/2023 |
| WO | 202368789 A1 | 4/2023 |
| WO | 202368790 A1 | 4/2023 |
| WO | 2023068642 A1 | 4/2023 |
| WO | 2023068785 A1 | 4/2023 |
| WO | 2023/073932 A1 | 5/2023 |
| WO | 2023/089759 A1 | 5/2023 |
| WO | 2023/089761 A1 | 5/2023 |
| WO | 202375505 A1 | 5/2023 |
| WO | 202383015 A1 | 5/2023 |
| WO | 202384191 A1 | 5/2023 |
| WO | 202392147 A1 | 5/2023 |
| WO | 2023073920 A1 | 5/2023 |
| WO | 2023073931 A1 | 5/2023 |
| WO | 2023089763 A1 | 5/2023 |
| WO | 2023/105771 A1 | 6/2023 |
| WO | 2023/112218 A1 | 6/2023 |
| WO | 2023/112247 A1 | 6/2023 |
| WO | 2023/112248 A1 | 6/2023 |
| WO | 202399874 A1 | 6/2023 |
| WO | 2023101452 A1 | 6/2023 |
| WO | 2023105776 A1 | 6/2023 |
| WO | 2023110704 A1 | 6/2023 |
| WO | 2023111242 A1 | 6/2023 |
| WO | 2023111255 A1 | 6/2023 |
| WO | 2023111360 A1 | 6/2023 |
| WO | 2023112149 A1 | 6/2023 |
| WO | 2023116935 A1 | 6/2023 |
| WO | 2023/127827 A1 | 7/2023 |
| WO | 2023/139358 A1 | 7/2023 |
| WO | 2023/140615 A1 | 7/2023 |
| WO | 2023128313 A1 | 7/2023 |
| WO | 2023132680 A1 | 7/2023 |
| WO | 2023135160 A1 | 7/2023 |
| WO | 2023139370 A1 | 7/2023 |

OTHER PUBLICATIONS

International Preliminary Report on Patentability Corresponding to Application No. PCT/US2023/074557, mailed Mar. 1, 2025.

\* cited by examiner

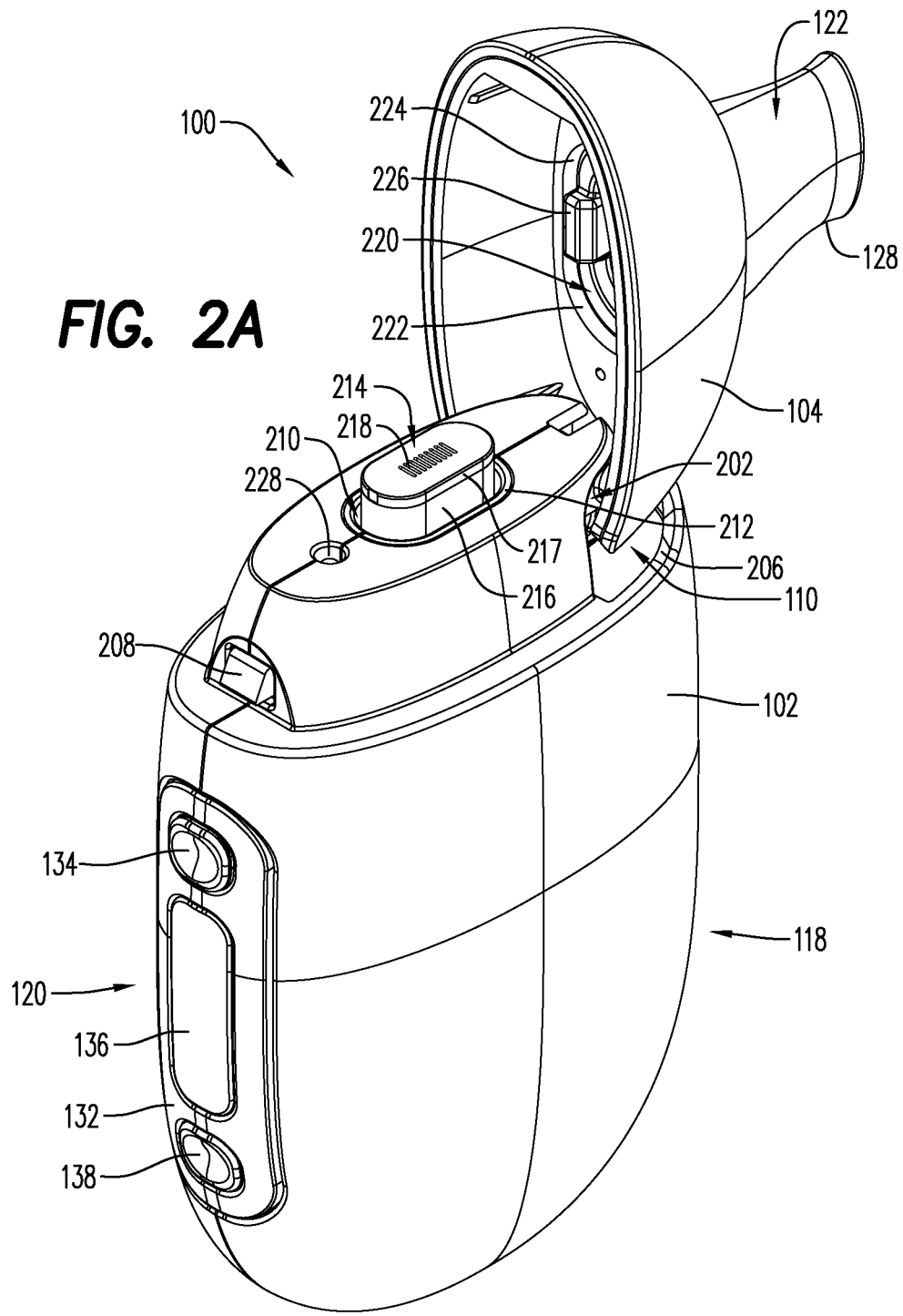

SESSION CONTROL SYSTEM

FIELD

The present disclosure relates to heat-not-burn (HNB) aerosol generating devices and capsules configured to generate an aerosol without involving a substantial pyrolysis of an aerosol-forming substrate.

DESCRIPTION OF RELATED ART

Some electronic devices are configured to heat a plant material to a temperature that is sufficient to release constituents of the plant material while keeping the temperature below a combustion point of the plant material so as to avoid any substantial pyrolysis of the plant material. Such devices may be referred to as aerosol-generating devices (e.g., heat-not-burn aerosol-generating devices), and the plant material heated may be tobacco and/or *cannabis*. In some instances, the plant material may be introduced directly into a heating chamber of an aerosol generating device. In other instances, the plant material may be pre-packaged in individual containers to facilitate insertion and removal from an aerosol-generating device.

BRIEF SUMMARY

New and useful systems, apparatuses, and methods for session control systems for aerosol-generating devices are set forth in the appended claims. Illustrative embodiments are also provided to enable a person skilled in the art to make and use the claimed subject matter.

For example, in some example embodiments, a session control system for a device is described. The session control system can include at least one processor and a memory coupled to the at least one processor. The memory can be configured to store instructions. The at least one processor can be configured to execute the instructions to cause the session control system to detect when a session has started, start a session timer, increment a puff variable when an airflow sensor detects that a puff has been taken, monitor the session timer against a time threshold and the puff variable against a puff threshold, and in response to a session threshold being met, end the session. The session timer can be configured to measure a length of the session and the puff variable can correspond to a total number of puffs taken.

In some example embodiments, the session threshold can be met when the puff variable equals the puff threshold. In some example embodiments, the puff threshold can be 20 puffs taken.

In some example embodiments, the session threshold can be met when the length of the session equals the time threshold. In some example embodiments, the time threshold can be seven minutes.

In some example embodiments, the session can be started when a control button is actuated and the device begins to preheat.

In some example embodiments, the session timer can be started when the device is preheated.

In some example embodiments, the at least one processor can be configured to execute the instructions to cause the session control system to display a session progress indicator on a consumer interface of the device. The session progress indicator can correspond to a length of the session remaining to meet the session threshold. In some example embodiments, the length of the session remaining to meet the session threshold is the lower of a percentage of a time remaining for the session timer to equal the time threshold and a percentage of a number of puffs remaining for the puff variable to equal the puff threshold.

In some example embodiments, the at least one processor can be configured to execute the instructions to cause the session control system to display a session complete indicator when the session threshold is met.

In some example embodiments, the at least one processor can be configured to execute the instructions to cause the session control system to actuate a haptic actuator at 20% of the session remaining to meet the session threshold and when the session threshold is met.

In some example embodiments, the at least one processor can be configured to execute the instructions to cause the session control system to start a periodic timer simultaneously with the session timer. The periodic timer can be configured to measure a metric report time. In some example embodiments, the metric report time can be ten seconds. In some example embodiments, the at least one processor can be configured to execute the instructions to cause the session control system to generate a metric report when the periodic timer elapses. The metric report can contain a percentage of a time remaining for the session timer to equal the time threshold and a percentage of a number of puffs remaining for the puff variable to equal the puff threshold.

In some example embodiments, the detecting that a puff has been taken can include detecting, with the airflow sensor, airflow through the device, measuring a length of time of the airflow through the device, determining if the length of time of the airflow through the device is greater than a puff length threshold, and incrementing the puff variable if the length of time of the airflow through the device is greater than the puff length threshold. In some example embodiments, the puff length threshold can be 350 milliseconds. In some example embodiments, detecting that a puff has been taken can further include starting a hysteresis timer if the length of time of the airflow through the device is greater than the puff length threshold, restarting the hysteresis timer if the airflow sensor detects additional airflow through the device prior to the hysteresis timer elapsing, and incrementing the puff variable when the hysteresis timer elapses. In some example embodiments, the hysteresis timer can be two seconds.

In some example embodiments, the monitoring the session timer against the time threshold and the puff variable against the puff threshold can include setting a first flag to indicate that either a percentage of the time threshold remaining or a percentage of the puff threshold remaining is equal to 20% and setting a second flag to indicate that either a percentage of the time threshold remaining or a percentage of the puff threshold remaining is equal to 0%. In some example embodiments, the monitoring the session timer against the time threshold and the puff variable against the puff threshold can further include actuating a haptic actuator of the device when the first flag is set and actuating a second haptic actuator when the second flag is set.

In some example embodiments, the at least one processor can be configured to execute the instructions to cause the session control system to calculate an amount of energy used by the device and monitor the amount of energy used by the device against an energy threshold. In some example embodiments, the session threshold can be met when the amount of energy used by the device equals the energy threshold.

In some example embodiments, the at least one processor can be configured to execute the instructions to cause the session control system to track an amount of time when airflow is flowing through the device from puffs taken and monitor the amount of time when airflow is flowing through the device from puffs taken against a puff time threshold. In some example embodiments, the session threshold can be met when the amount of time when airflow is flowing through the device from puffs taken equals the puff time threshold.

Also described herein is a multi-session control system for a device. The multi-session control system can include at least one processor and a memory coupled to the at least one processor. The memory can be configured to store instructions. The at least one processor can be configured to execute the instructions to cause the multi-session control system to detect when a session has started, start a device timer, increment a puff variable when an airflow sensor detects that a puff has been taken, monitor the device timer against a time threshold and the puff variable against a puff threshold, and in response to a device threshold being met, power off the device. The device timer can be configured to measure a total use time of the device and the puff variable can correspond to a total number of puffs taken.

In some example embodiments, the at least one processor can be configured to execute the instructions to cause the multi-session control system to detect when the session has ended, pause the device timer when the session has ended, detect when a new session has started, and restart the device timer when the device is preheated after the new session has started.

Also described herein is a non-transitory computer-readable medium including instructions that, when executed by processing circuitry of a device, cause the device to perform the functions described herein. The functions can include detecting when a session has started, starting a session timer, incrementing a puff variable when an airflow sensor detects that a puff has been taken, monitoring the session timer against a time threshold and the puff variable against a puff threshold, and in response to a session threshold being met, ending the session. The session timer can be configured to measure a length of the session and the puff variable can correspond to a total number of puffs taken.

Also described herein is a session control system for a device. The session control system can include a processor means and a memory means. The memory means can be coupled to the processor means and can be configured to store instructions. The processor means can be configured to execute instructions to cause the session control system to detect when a session has started, start a session timer, increment a puff variable when an airflow sensor detects that a puff has been taken, monitor the session timer against a time threshold and the puff variable against a puff threshold, and in response to a session threshold being met, end the session. The session timer can be configured to measure a length of the session and the puff variable can correspond to a total number of puffs taken.

Also described herein is a method of operating a session control system of a device. The method can include detecting when a session has started, starting a session timer, incrementing a puff variable when an airflow sensor detects that a puff has been taken, monitoring the session timer against a time threshold and the puff variable against a puff threshold, and in response to a session threshold being met, ending the session. The session timer can be configured to measure a length of the session and the puff variable can correspond to a total number of puffs taken.

Also described herein is a non-transitory computer-readable medium including instructions that, when executed by processing circuitry of a device, cause the device to perform the functions described herein. The functions can include detecting when a session has started, starting a device timer, incrementing a puff variable when an airflow sensor detects that a puff has been taken, monitoring the device timer against a time threshold and the puff variable against a puff threshold, and in response to a device threshold being met, power off the device. The device timer can be configured to measure a total use time of the device and the puff variable can correspond to a total number of puffs taken.

Also described herein is a multi-session control system for a device. The multi-session control system can include a processor means and a memory means. The memory means can be coupled to the processor means and can be configured to store instructions. The processor means can be configured to execute instructions to cause the multi-session control system to detect when a session has started, start a device timer, increment a puff variable when an airflow sensor detects that a puff has been taken, monitor the device timer against a time threshold and the puff variable against a puff threshold, and in response to a device threshold being met, power off the device. The device timer can be configured to measure a total use time of the device and the puff variable can correspond to a total number of puffs taken.

Also described herein is a method of operating a multi-session control system of a device. The method can include detecting when a session has started, starting a device timer, incrementing a puff variable when an airflow sensor detects that a puff has been taken, monitoring the device timer against a time threshold and the puff variable against a puff threshold, and in response to a device threshold being met, powering off the device. The device timer can be configured to measure a total use time of the device and the puff variable can correspond to a total number of puffs taken.

Objectives, advantages, and a preferred mode of making and using the claimed subject matter may be understood best by reference to the accompanying drawings in conjunction with the following detailed description of illustrative embodiments.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 2A is a top right, front perspective view of the device, where the lid is opened and where the device includes a capsule.

DESCRIPTION OF EXAMPLE EMBODIMENTS

Figure 1:
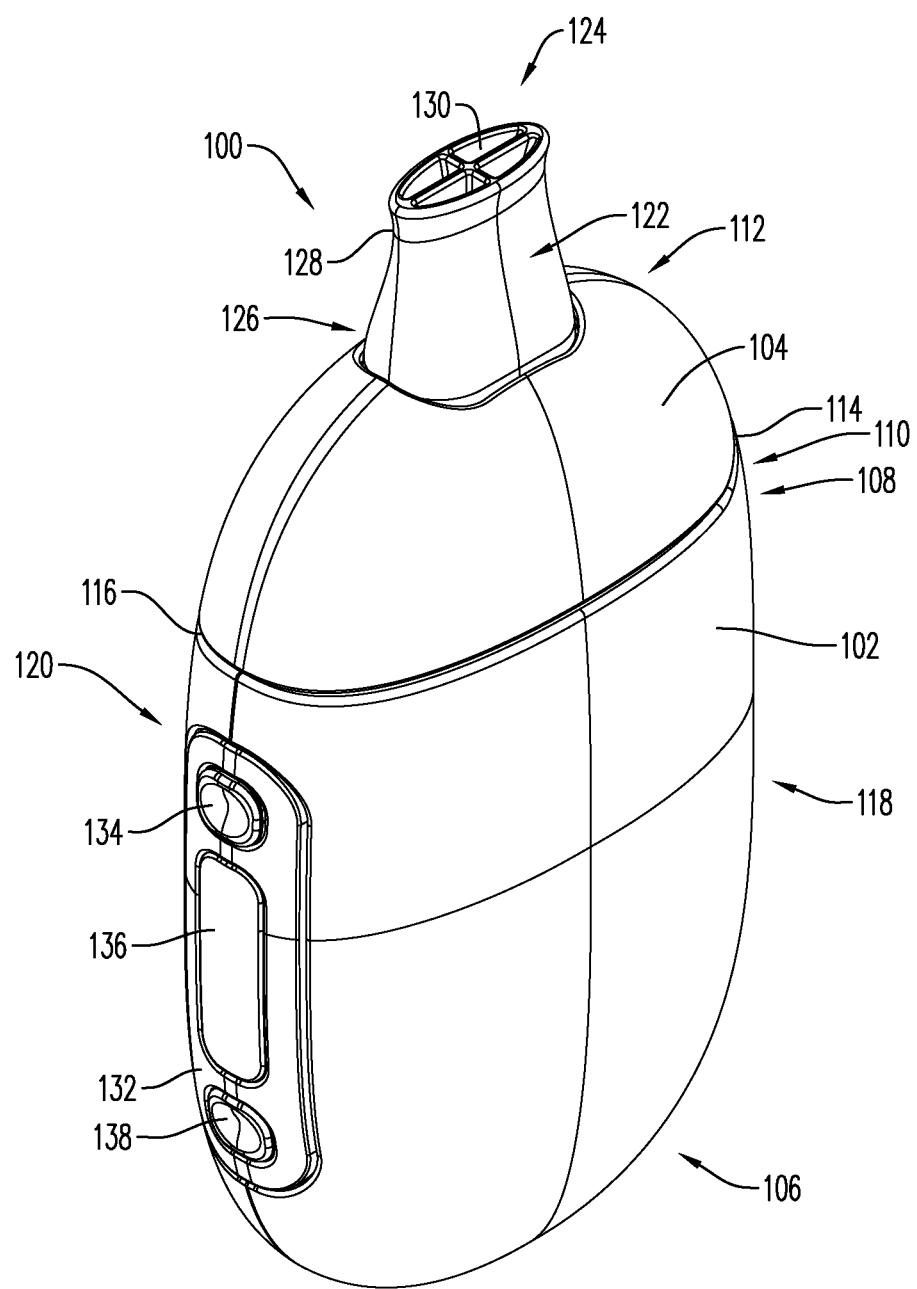
FIG. 1 is a top right, front perspective view of a device in accordance with at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, "coupled" includes both removably coupled and permanently coupled. For example, when an elastic layer and a support layer are removably coupled to one another, the elastic layer and the support layer can be separated upon the application of sufficient force.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and/or executing instructions in a defined manner.

FIGS. 1 and 2A-2C are illustrations of a device 100 according to some example embodiments. In some embodiments, the device 100 may be an aerosol-generating device. Referring to FIG. 1, a top perspective view of the device 100 is shown. In some embodiments, a main body of the device 100 may have a general oblong or pebble shape. The main body of the device 100 may include a housing 102 and a lid mechanism or a lid 104. The housing 102 may have a first end 106 and a second end 108 opposite the first end 106. The lid may have a first end 110 and a second end 112 opposite the first end 110. The first end 110 of the lid 104 may be fixedly coupled to the second end 108 of the housing 102 at a first point 114 and releasably couplable to the second end 108 of the housing 102 at a second point 116. The first point 114 of the housing 102 may be on a first side 118 of the device 100. The second point 116 of the housing 102 may be on a second side 120 of the device 100.

In some example embodiments, the device 100 may further include a mouthpiece 122. In at least some example embodiments, the mouthpiece 122 may include a first end 124 and a second end 126 opposite the first end 124. The second end 126 of the mouthpiece 122 may be coupled to the second end 112 of the lid 104. In some embodiments, the second end 126 of the mouthpiece 122 may be releasably coupled to the second end 112 of the lid 104. In at least one example embodiment, the mouthpiece 122 may be tapered between the first end 124 and the second end 126. For example, the diameter or average length/width dimensions of the first end 124 may be smaller than the diameter or average length/width dimensions of the second end 126. Towards the first end 124, the taper may have a slight inward curvature 128 that is configured to receive the lips of an adult consumer and improve the comfort and experience. In some embodiments, the first end 124 may have an oblong or elliptical shape and may include one or more outlets 130. For example, the first end 124 may include four outlets 130, such that four or more different areas or quadrants of the adult consumer's mouth can be engaged during use of the device 100. In other embodiments, the mouthpiece 122 may have fewer outlets than the four outlets 130 or more outlets than the four outlets 130.

In some example embodiments, the housing 102 may include a consumer interface panel 132 disposed on the second side 120 of the device 100. For example, the consumer interface panel 132 may be an oval-shaped panel that runs along the second side 120 of the device 100. The consumer interface panel 132 may include a latch release button 134, as well as a communication screen 136 and/or a control button 138. For example, in at least some example embodiments, the consumer interface panel 132 may include the communication screen 136 disposed between the latch release button 134 and the control button 138. As illustrated, the latch release button 134 may be disposed towards the second end 108 of the device 100, and the control button 138 may be disposed towards the first end 106 of the device 100. The latch release button 134 and the control button 138 may be adult consumer interaction buttons. The latch release button 134 and the control button 138 may have a substantially circular shape with a center depression or dimple configured to direct the pressure applied by the adult consumer, although example embodiments are not limited thereto. The control button 138 may turn on and off the device 100. Though only the two buttons are illustrated, it should be understood more or less buttons may be provided depending on the available features and desired adult consumer interface.

The communication screen 136 may be a consumer interface such as a human-machine interface (HMI) display. In at least one example embodiment, the communication screen 136 may be an integrated thin-film transistor ("TFT") screen. In other example embodiments, the communication screen 136 is an organic light emitting diode ("OLED") or light emitting diode ("LED") screen. The communication screen 136 is configured for adult consumer engagement and may have a generally oblong shape.

In some embodiments, an exterior of the housing 102 and/or the lid 104 may be formed from a metal (such as aluminum, stainless steel, and the like); an aesthetic, food contact rated plastic (such as, a polycarbonate (PC), acrylonitrile butadiene styrene (ABS) material, liquid crystalline polymer (LCP), a copolyester plastic, or any other suitable polymer and/or plastic); or any combination thereof. The mouthpiece 122 may be similarly formed from a metal (such as aluminum, stainless steel, and the like); an aesthetic, food contact rated plastic (such as, a polycarbonate (PC), acrylonitrile butadiene styrene (ABS) material, liquid crystalline polymer (LCP), a copolyester plastic, or any other suitable polymer and/or plastic); and/or plant-based materials (such as wood, bamboo, and the like). One or more interior surfaces of the housing 102 and/or the lid 104 may be formed from or coated with a high temperature plastic (such as, polyetheretherketone (PEEK), liquid crystal polymer (LCP), or the like).

FIG. 2A shows another top perspective view of the device 100 with the lid 104 in an open configuration. The lid 104 may be fixedly coupled to the housing 102 at the first point 114 by a hinge 202, or other similar connector, that allows the lid 104 to move (e.g., swing and rotate) from an open position to a closed position. In some embodiments, the hinge 202 may be a torsion spring. In at least some example embodiments, the housing 102 may include a recess 204 at the first point 114. The recess 204 may be configured to receive a portion of the lid 104 so as to allow for an easy and smooth movement of the lid 104 from the open position to the closed position (and vice versa). The recess 204 may have a structure that corresponds with a relative portion of the lid 104. For example, as illustrated, the recess 204 may include a substantially curved portion 206 that has a general concave shape that corresponds with the curvature of the lid 104, which has a general convex shape.

The lid 104 may be releasably couplable to the housing 102 at the second point 116 by a latch 208, or other similar connector, that allows the lid 104 to be fixed or secured in the closed position and easily releasable to allow the lid 104 to move from the closed position to the open position. In at least one example embodiment, the latch 208 may be coupled to a latch release mechanism disposed within the housing. The latch release mechanism may be configured to move the latch 208 from a first or closed position to a second or open position.

When the lid 104 is in the open position as shown in FIG. 2A, a capsule receiving cavity 210 of the housing 102 is exposed. A capsule connector 212 may define the capsule receiving cavity 210 of the housing 102. In some embodiments, the capsule connector 212 may be mounted or otherwise secured to a printed circuit board (PCB) within the housing 102.

As shown in FIG. 2A, a capsule 214 may be received by the capsule receiving cavity 210. The capsule may house a consumable of the device 100. In some embodiments, not pictured herein, there may be a gasket disposed around the capsule 214 to help secure the capsule 214 in place within the housing 102. The capsule 214 may include a housing 216 configured to contain an aerosol-forming substrate and a heater. In some embodiments, the housing 216 may be in the form of a cover such as a shell or a box sleeve. In some embodiments, the capsule 214 can include a first end cap 217 and a second end cap. The second end cap may be opposite the first end cap 217 such that is disposed within the housing 102 when the capsule 214 is received by the capsule receiving cavity 210.

As discussed herein, an aerosol-forming substrate is a material or combination of materials that may yield an aerosol. An aerosol relates to the matter generated or output by the devices disclosed, claimed, and equivalents thereof. The material may include a compound (e.g., nicotine, cannabinoid), wherein an aerosol including the compound is produced when the material is heated. The heating may be below the combustion temperature so as to produce an aerosol without involving a substantial pyrolysis of the aerosol-forming substrate or the substantial generation of combustion byproducts (if any). Thus, in an example embodiment, pyrolysis does not occur during the heating and resulting production of aerosol. In other instances, there may be some pyrolysis and combustion byproducts, but the extent may be considered relatively minor and/or merely incidental.

The aerosol-forming substrate may be a fibrous material. For instance, the fibrous material may be a botanical material. The fibrous material is configured to release a compound when heated. The compound may be a naturally occurring constituent of the fibrous material. For instance, the fibrous material may be plant material such as tobacco, and the compound released may be nicotine. The term "tobacco" includes any tobacco plant material including tobacco leaf, tobacco plug, reconstituted tobacco, compressed tobacco, shaped tobacco, or powder tobacco, and combinations thereof from one or more species of tobacco plants, such as *Nicotiana rustica* and *Nicotiana tabacum*.

In some example embodiments, the tobacco material may include material from any member of the genus *Nicotiana*. In addition, the tobacco material may include a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof, and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass. Furthermore, in some instances, the tobacco material may be mixed and/or combined with at least one of propylene glycol, glycerin, sub-combinations thereof, or combinations thereof.

The compound may also be a naturally occurring constituent of a medicinal plant that has a medically-accepted therapeutic effect. For instance, the medicinal plant may be a cannabis plant, and the compound may be a cannabinoid. Cannabinoids interact with receptors in the body to produce a wide range of effects. As a result, cannabinoids have been used for a variety of medicinal purposes (e.g., treatment of pain, nausea, epilepsy, psychiatric disorders). The fibrous material may include the leaf and/or flower material from one or more species of cannabis plants such as *Cannabis sativa, Cannabis indica,* and *Cannabis ruderalis*. In some instances, the fibrous material is a mixture of 60-80% (e.g., 70%) *Cannabis sativa* and 20-40% (e.g., 30%) *Cannabis indica*.

Examples of cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrahydrocannabinolic acid (THCA) is a precursor of tetrahydrocannabinol (THC), while cannabidiolic acid (CBDA) is precursor of cannabidiol (CBD). Tetrahydrocannabinolic acid (THCA) and cannabidiolic acid (CBDA) may be converted to tetrahydrocannabinol (THC) and cannabidiol (CBD), respectively, via heating. In an example embodiment, heat from a heater may cause decarboxylation so as to convert the tetrahydrocannabinolic acid (THCA) in the capsule to tetrahydrocannabinol (THC), and/or to convert the cannabidiolic acid (CBDA) in the capsule to cannabidiol (CBD).

In instances where both tetrahydrocannabinolic acid (THCA) and tetrahydrocannabinol (THC) are present in the capsule, the decarboxylation and resulting conversion will cause a decrease in tetrahydrocannabinolic acid (THCA) and an increase in tetrahydrocannabinol (THC). At least 50% (e.g., at least 87%) of the tetrahydrocannabinolic acid (THCA) may be converted to tetrahydrocannabinol (THC) during the heating of the capsule. Similarly, in instances where both cannabidiolic acid (CBDA) and cannabidiol (CBD) are present in the capsule, the decarboxylation and resulting conversion will cause a decrease in cannabidiolic acid (CBDA) and an increase in cannabidiol (CBD). At least 50% (e.g., at least 87%) of the cannabidiolic acid (CBDA) may be converted to cannabidiol (CBD) during the heating of the capsule.

Furthermore, the compound may be or may additionally include a non-naturally occurring additive that is subsequently introduced into the fibrous material. In one instance, the fibrous material may include at least one of cotton, polyethylene, polyester, rayon, combinations thereof, or the like (e.g., in a form of a gauze). In another instance, the fibrous material may be a cellulose material (e.g., non-tobacco and/or non-cannabis material). In either instance, the compound introduced may include nicotine, cannabinoids, and/or flavorants. The flavorants may be from natural sources, such as plant extracts (e.g., tobacco extract, cannabis extract), and/or artificial sources. In yet another instance, when the fibrous material includes tobacco and/or cannabis, the compound may be or may additionally include one or more flavorants (e.g., menthol, mint, vanilla). Thus, the compound within the aerosol-forming substrate may include naturally occurring constituents and/or non-naturally occurring additives. In this regard, it should be understood that existing levels of the naturally occurring constituents of the aerosol-forming substrate may be increased through supplementation. For example, the existing levels of nicotine in a quantity of tobacco may be increased through supplementation with an extract containing nicotine. Similarly, the existing levels of one or more cannabinoids in a quantity of *cannabis* may be increased through supplementation with an extract containing such cannabinoids.

The first end cap 217 can include a first opening 218. In some embodiments, the first opening 218 may be a series of openings disposed through the first end cap 217. Similarly, the second end cap can include a second opening that may be a series of openings in some embodiments. In some embodiments, the first end cap 217 and/or the second end cap may be transparent so as to serve as windows configured to permit a viewing of the contents/components (e.g., aerosol-forming substrate and/or heater) within the capsule 214.

The capsule receiving cavity 210 may have a base that may be inside the housing 102. In some embodiments, the base may include at least one contact point that may be configured to couple to one or more contact points of the capsule 214 when the capsule 214 is received by the capsule receiving cavity 210. When the capsule 214 is inserted into the capsule receiving cavity 210, the weight of the capsule 214 itself may not be sufficient to compress the at least one contact point of the base of the capsule receiving cavity 210. As a result, the capsule 214 may simply rest on exposed pins of the at least one contact point without any compression (or without any significant compression) of electrical contacts of the at least one contact point. Additionally, the weight of the lid 104 itself, when pivoted to transition to a closed position, may not compress the electrical contacts of the at least one contact point to any significant degree and, instead, may simply rest on the capsule 214 in an intermediate, partially open/closed position. In such an instance, a deliberate action (e.g., downward force) to close the lid 104 will cause a surface 220 of the lid 104 to press down onto the capsule 214 to provide the desired seal and also cause the capsule 214 to compress and, thus, fully engage the electrical contacts of the at least one contact point.

Additionally, a full closure of the lid 104 may result in an engagement with the latch 208, which may maintain the closed position and the desired mechanical/electrical engagements involving the capsule 214 until released (e.g., via the latch release button 134). The force requirement for closing the lid 104 may help to ensure and/or improve air/aerosol sealing and to provide a more robust electrical connection, as well as improved device and thermal efficiency and battery life by reducing or eliminating early power draws and/or parasitic heating of the capsule 214.

The lid 104 may include an inner cavity 222 that may be adapted to receive the housing 102 when the lid is in the closed position. In some embodiments, the inner cavity 222 of the lid 104 may include an impingement or engagement member or the surface 220 configured to engage the capsule 214 when the lid 104 is pivoted to transition to the closed position. The surface 220 of the lid 104 may include a recess that may correspond to the size and shape of the capsule and/or a resilient material to enhance an interface with the capsule to provide the desired seal. In some embodiments, the lid 104 may further include an opening 224 that may be adapted to receive the second end 126 of the mouthpiece 122. The mouthpiece 122 may include at least one extension 226 that may be received by the opening 224 of the lid 104 to secure the mouthpiece 122 to the lid 104. In some embodiments, the lid 104 may further include a projection that may be configured to couple with a recess 228 of the housing 102. The projection may fit within the recess 228 when the lid 104 is coupled to the housing 102 in the closed position.

Figure 2B:
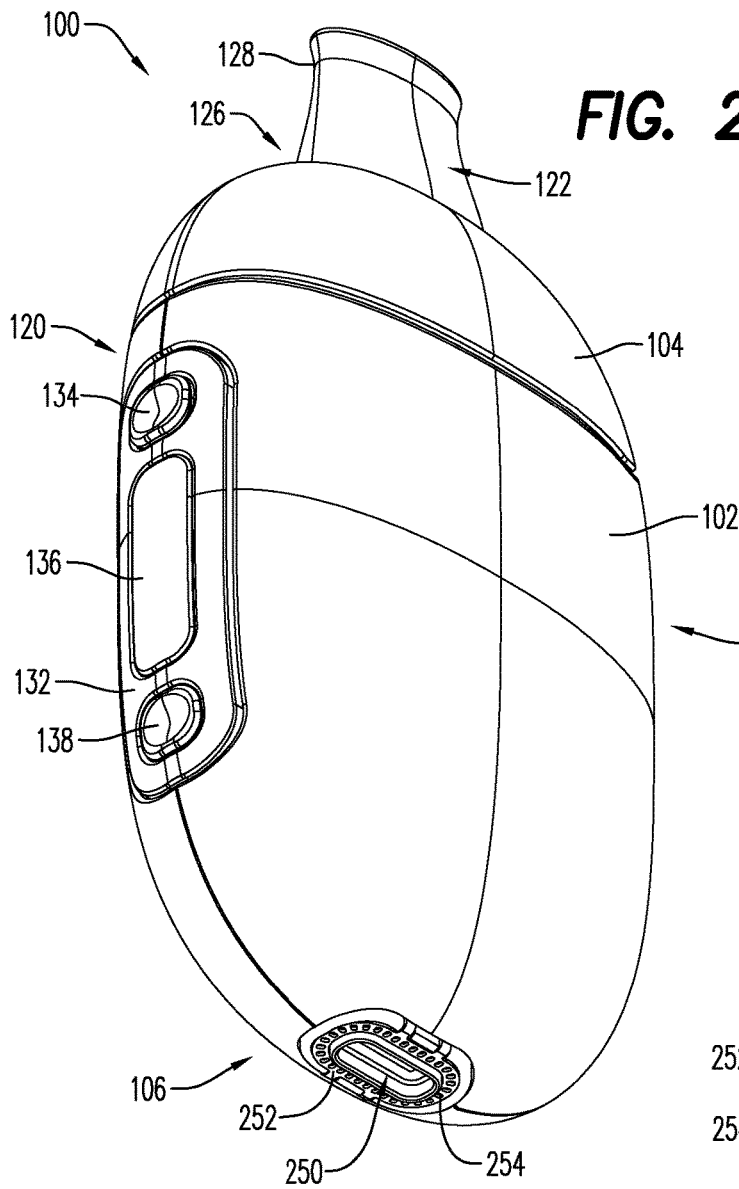
FIG. 2B is a bottom perspective view of the device.

Referring to FIG. 2B, a bottom perspective view of the device 100 is shown. In some embodiments, the housing 102 may define a port or a charging connector 250. The charging connector may be defined or disposed the first end 106 of the housing 102. The charging connector 250 may be configured to receive an electric current (e.g., via a USB/mini-USB cable) from an external power source so as to charge a power source internal to the device 100. In some embodiments, a protective grille 252 is disposed around the charging connector 250. The protective grille 252 may be configured to help reduce or prevent debris ingress and/or the inadvertent blockage of the incoming airflow. For example, the protective grille 252 may define a plurality of pores 254 along its length or course. As illustrated, the protective grille 252 may have an annular form that surrounds the charging connector 250. In this regard, the pores 254 may also be arranged (e.g., in a serial arrangement) around the charging connector 250. Each of the pores 254 may have an oval or circular shape, although not limited thereto. In at least one example embodiment, the protective grille 252 may include an approved food contact material. For example, the protective grille 252 may include plastic, metal (e.g., stainless steel, aluminum), or any combination thereof. In at least one example embodiment, a surface of the protective grille 252 may be coated, for example with a thin layer of plastic, and/or anodized.

The pores 254 in the protective grille 252 may function as inlets for air drawn into the device 100. During the operation of the device 100, ambient air entering through the pores 254 in the protective grille 252 around the charging connector 250 will converge to form a combined flow that then travels to the capsule 214. For example, the pores 254 may be in fluidic communication with the capsule receiving cavity 210. In at least one example embodiment, air may be drawn from the pores 254 and through the capsule receiving cavity 210. For example, air may be drawn through the capsule 214 received by the capsule receiving cavity 210 and out of the mouthpiece 122.

Figure 2C:
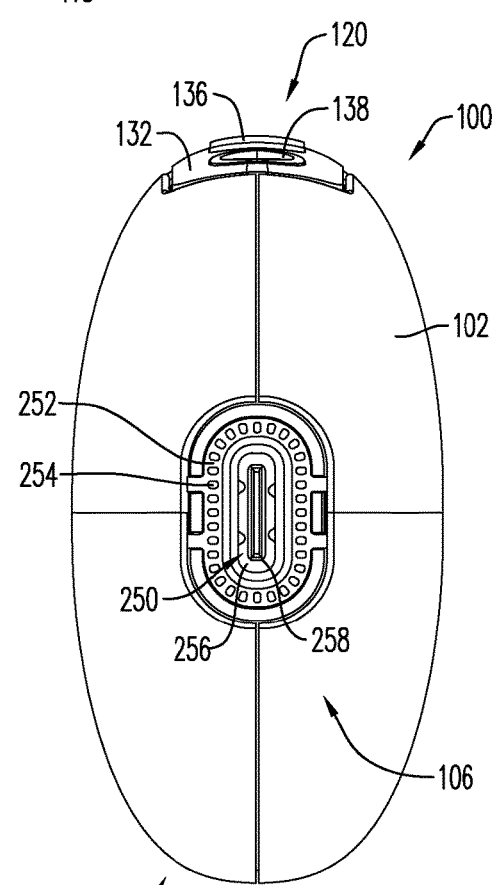
FIG. 2C is a bottom-up view of the device.

Referring to FIG. 2C, a bottom-up view of the device 100 is shown. In some embodiments, the charging connector 250 may be an assembly defining a cavity 256 that has a projection 258 within the cavity 256. In at least one example embodiment, the projection 258 does not extend beyond the rim of the cavity 256. In addition, the charging connector 250 may also be configured to send data to and/or receive data (e.g., via a USB/mini-USB cable) from another aerosol generating device (e.g., heat not-burn (HNB) aerosol generating device) and/or other electronic device (e.g., phone, tablet, computer, and the like). In at least one embodiment, the device 100 may instead or additionally be configured for wireless communication (e.g., via Bluetooth) with such other aerosol generating devices and/or electronic devices.

As should be understood, the device 100 and capsule 214 include additional components (e.g., heater and internal air flow path) such as described in "HEAT-NOT-BURN (HNB) AEROSOL-GENERATING DEVICES AND CAPSULES", and assigned application Ser. No. 17/947,436, the entire contents of which are herein incorporated by reference.

Figure 3:
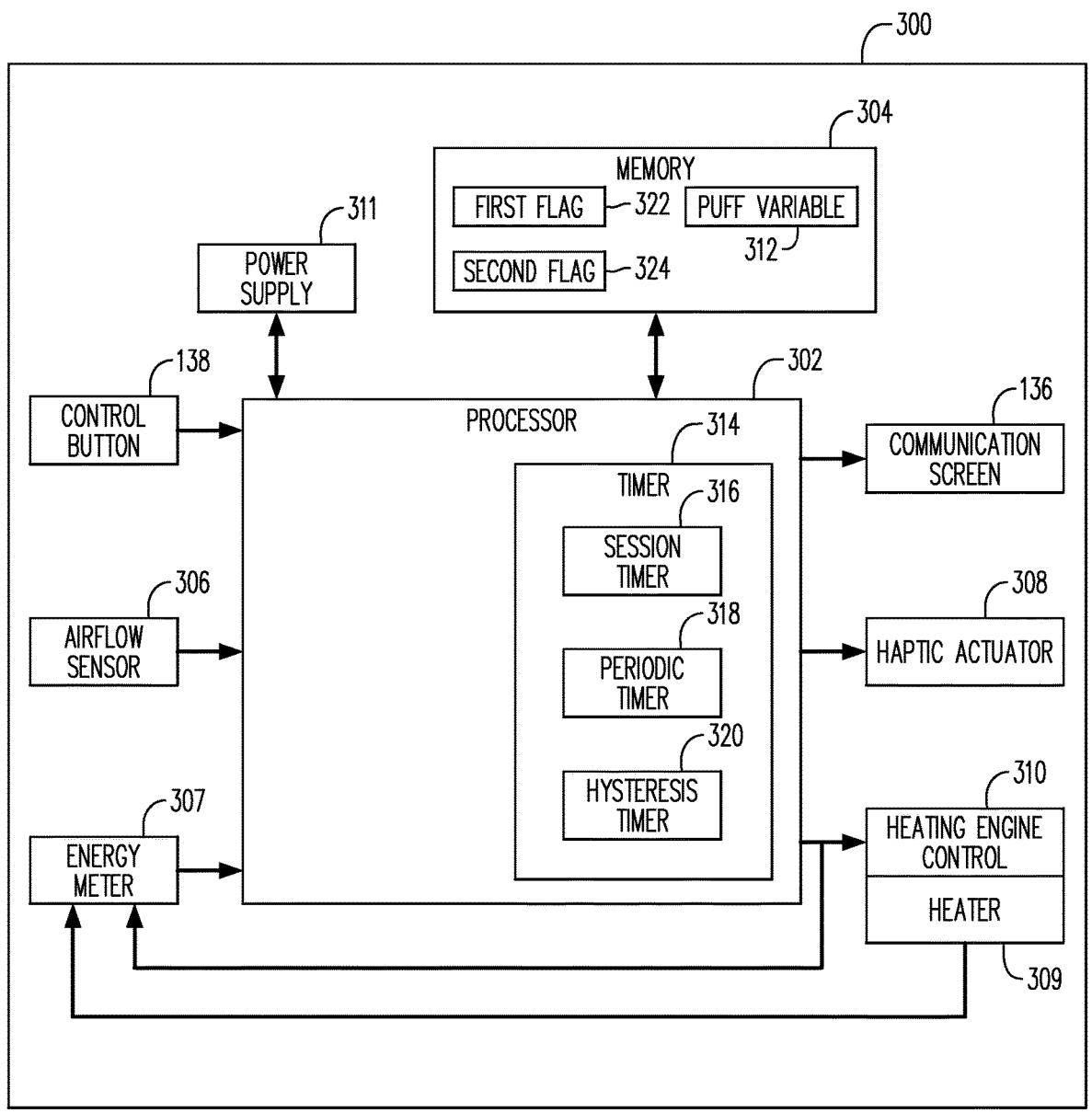
FIG. 3 is a block diagram of a session control system of the device according to an example embodiment.

Referring to FIG. 3, a block diagram of a session control system 300 of the device 100 according to an example embodiment is shown. The session control system 300 may be configured to monitor progress of a session of the device 100. The session control system 300 may also be configured to end the session when a session threshold is met. In some embodiments, the session control system 300 may monitor two or more criteria to determine the progress of a session and to determine when the session threshold is met. A first criteria may be a number of puffs taken since a start of a session. A second criteria may be an elapsed time of the session. A third criteria may be an energy consumed by the device 100 during a session. A fourth criteria may be an amount of time that air is flowing through the device 100 from puffs taken such as puffs taken by a consumer. The session threshold may be met when either the number of puffs taken since the start of the session equals a puff threshold, when the elapsed time of the session equals a time threshold, when the amount of energy used by the device 100 to power the heater equals an energy threshold, or when the amount of time that air is flowing through the device from puffs taken equals a puff time threshold. In some embodiments, any of the above criteria may be monitored alone or in combination to determine when the session threshold has been met.

When the session is considered complete, the session control system 300 may end the session of the device 100. In some embodiments, the session control system 300 may end the session of the device 100 by powering off the heater of the device 100. In some embodiments, the session control system 300 may further be configured to communicate the progress of a session of the device 100 to a consumer via the communication screen 136 or another output method of the device 100.

The session control system 300 may include a processor 302, a memory 304, the control button 138, an airflow sensor 306, an energy meter 307, a haptic actuator 308, a heater 309 coupled to a heating engine control 310, and a power supply 311. In some embodiments, the memory 304 may include a puff variable 312, a first flag 322, and a second flag 324 and the processor 302 may include a timer 314. In other embodiments, the puff variable 312, the first flag 322, and/or the second flag 324 may be stored in the processor 302 such as in local storage of the processor 302 and the timer 314 may be executed using instructions stored in the memory 304. The processor 302 may communicate with the memory 304, the control button 138, the airflow sensor 306, the energy meter 307, the haptic actuator 308, the heater 309, the heating engine control 310, the power supply 311, the puff variable 312, the timer 314, the first flag 322, and the second flag 324.

The processor 302 may be hardware including logic circuits, a hardware/software combination that may be configured to execute software, or a combination thereof. For example, the processor 302 may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or another similar device. The processor 302 may be configured as a special purpose machine (e.g., a processing device) to execute the software or instructions, stored in the memory 304. The software may be embodied as program code including instructions for performing and/or controlling any or all operations described herein as being performed by the processor 302.

In other example embodiments, other processing circuitry or control circuitry may be used.

The memory 304 is illustrated as being external to the processor 302, in some example embodiments the memory 304 may be on board the processor 302. The memory 304 may describe any of the terms "storage medium", "computer readable storage medium" or "non-transitory computer readable storage medium" and may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing, or carrying instructions and/or data.

The puff variable 312 may be a counter that may be set to zero when a session of the device 100 starts. The puff variable 312 may be incremented by one each time that a puff is detected. A puff may be detected when a consumer applies a negative pressure through the mouthpiece 122 of the device 100 after placing his or her mouth over the mouthpiece 122 of the device 100. In some embodiments, the puff variable 312 may be compared to a puff threshold to determine the progress of a session of the device 100. The session threshold may be met when the puff variable 312 equals the puff threshold. In some embodiments, the puff threshold may be 20 puffs taken by the consumer so the session threshold may be met when the puff variable 312 equals 20. As described in further detail below, in some embodiments, the airflow sensor 306 may be configured to detect a puff such that the puff variable can be incremented each time the consumer takes a puff.

The timer 314 may include one or more timers configured to measure one or more times/time periods related to the device 100 and/or the session control system 300. The timer 314 may include a session timer 316 that may be configured to measure a session time. The session time may be a length of a session of the device 100. The session threshold may be met when the session time equals the time threshold. In some embodiments, the time threshold may be seven minutes so the session threshold may be met when the session time equals seven minutes.

The timer 314 may include a periodic timer 318 that may be configured to measure a metric report time. The metric report time may be less than the session time in some embodiments. When the metric report time elapses, information related to the progress of a session may be calculated and output on at least the communication screen 136. In some embodiments, the periodic timer 318 may be actuated simultaneously with the session timer 316. Additionally, the periodic timer 318 may be refreshed once it elapses such that the information related to the progress of the session may be calculated and output on the communication screen 136 periodically during the session. In some embodiments, the metric report time may be ten seconds such that every ten seconds the periodic timer 318 is reset and the information related to the progress of the session is calculated and output on at least the communication screen 136. However, example embodiments are not limited thereto.

The timer 314 may include a hysteresis timer 320 that may be configured to measure a hysteresis time. The hysteresis time may be a minimum length of time between puffs of the device 100 such that each puff is measured as an individual puff by the airflow sensor 306 and the puff variable 312. The hysteresis time will be explained in greater detail below.

In some embodiments, the session control system 300 may additionally include at least one flag that may be set to indicate a status of a session of the device 100. The at least one flag may include the first flag 322 and the second flag 324. The first flag 322 may be set when any of the session metrics is equal to a first threshold. For example, the first flag 322 may be set when a percentage of puffs remaining for the puff variable 312 to equal the puff threshold is equal to the first threshold, when a percentage of time remaining for the session time to equal the time threshold is equal to the first threshold, when a percentage of an amount of energy left for the amount of energy used by the device 100 to power the heater 309 to reach the energy threshold is equal to the first threshold, or when a percentage of time of airflow through the device 100 to equal the puff time threshold is equal to the first threshold. In some embodiments, the first threshold may be 20%.

The second flag 324 may be set when any of the session metrics is equal to the second threshold. For example, the second flag 324 may be set when a percentage of puffs remaining for the puff variable 312 to equal the puff threshold is equal to a second threshold, when a percentage of time remaining for the session time to equal the time threshold is equal to the second threshold, when a percentage of an amount of energy left for the amount of energy used by the device 100 to power the heater 309 to reach the energy threshold is equal to the second threshold, or when a percentage of time remaining of airflow through the device 100 to equal the puff time threshold is equal to the second threshold. In some embodiments, the second threshold may be 0%.

The control button 138 may be configured to generate a signal indicating that a consumer has switched the device 100 to an "on" state or to an "off" state. When the device 100 is switched to an "on" state, the device 100 may begin to preheat. In some embodiments, a session may start once the control button 138 is pressed. Despite the session starting when the control button 138 is pressed, the session timer 316 may not be actuated until the device 100 is preheated. Once the device 100 is preheated, the session timer 316 may be actuated.

The airflow sensor 306 may be configured to detect and/or measure characteristics of airflow through the device 100.

For example, the airflow sensor 306 may be configured to detect when air is flowing through the device 100. In at least one example embodiment, the airflow sensor 306 may be a microelectromechanical system (MEMS) flow or pressure sensor or another type of sensor configured to measure air flow such as a hot-wire anemometer. In other embodiments, the airflow sensor 306 may be another known sensor. The airflow sensor 306 may be operated as a puff sensor by detecting a draw with a flow value greater than or equal to about 1 mL/s, and terminating a draw when the flow value subsequently drops to about 0 mL/s. In an example embodiment, the airflow sensor 306 may be a MEMS flow sensor based differential pressure sensor with the differential pressure (in Pascals) converted to an instantaneous flow reading (in mL/s) using a curve fitting calibration function or a Look Up Table (of flow values for each differential pressure reading). In another example embodiment, the flow sensor may be a capacitive pressure drop sensor.

In some embodiments, the airflow sensor 306 may be communicatively coupled with the processor 302 such that the processor 302 is configured to measure a length of time that airflow is flowing through the device 100. It should be understood that while it may be stated that the airflow sensor 306 detects a puff, it may be the processor 302 detecting a signal received from the airflow sensor 306 that detects that a puff has been taken. In some embodiments, a puff may be detected when a negative pressure is detected through the mouthpiece 122 of the device 100. In some embodiments, the airflow sensor 306 may be communicatively coupled with the puff variable 312 of the processor 302 such that the puff variable 312 is incremented each time the airflow sensor 306 detects that a puff has been taken. In some embodiments, the processor 302 may be configured to compare the length of time that airflow is flowing through the device 100 to a puff length threshold. If the length of time that airflow is flowing through the device 100 is less than the puff length threshold, the puff variable 312 may not be incremented. If the length of time that airflow is flowing through the device 100 is greater than or equal to the puff length threshold, the puff variable 312 may be incremented by the processor 302.

The determination of whether the length of time that airflow is flowing through the device 100 is greater than or less than the puff length threshold will accommodate consumers who routinely create short bursts of airflow through the device 100. Any puffs less than the puff length threshold will not increment the puff variable 312 and thus the session will not be shorted by any of these short puffs. In some embodiments, the puff length threshold may be 350 milliseconds. Thus, if a puff is less than 350 milliseconds long, the processor does not increment the puff variable 312.

The airflow sensor 306 may additionally be communicatively coupled with the hysteresis timer 320 of the processor 302. As discussed above, the hysteresis timer 320 may be configured to measure a hysteresis time. The hysteresis timer 320 may be actuated at an end of a puff that exceeds the puff length threshold and prior to the puff variable 312 being incremented. If an additional puff end is detected prior to the hysteresis timer elapsing, the hysteresis timer 320 may be restarted. Once the hysteresis timer 320 elapses, the puff variable 312 may be incremented and the hysteresis timer 320 may be reset such that it can be actuated when a next puff end is detected. In some embodiments, the hysteresis time may be two seconds. The hysteresis timer 320 may be configured to prevent over-counting of puffs, especially for consumers who have a "double puff" profile. These consumers may routinely take a short inhale followed by a longer inhale. The hysteresis timer 320 may prevent both of those puffs from being counted by the puff variable 312 to prevent over-counting of puffs.

In some embodiments, the airflow sensor 306 may additionally be configured to store or track an amount of time that airflow is flowing through the device 100 from puffs taken by a consumer. The amount of time that airflow is flowing through the device 100 from puffs taken by a consumer may be monitored against the puff time threshold. The amount of time that airflow is flowing through the device 100 may be the total amount of time of airflow during a session and may include any double puffs or puffs less than the puff length threshold as described above. In some embodiments, the session threshold may be met such that a session of the device 100 may end if the amount of time that airflow is flowing through the device 100 reaches the puff time threshold.

The energy meter 307 may be configured to measure an amount of energy used by the device 100 during a session to power the heater 309. In some embodiments, the energy meter 307 may further be configured to compare the amount of energy used by the device 100 to power the heater 309 to an energy threshold. In some embodiments, the session threshold may be met if the amount of energy used by the device 100 to power the heater 309 during a session equals the energy threshold.

The communication screen 136 may be configured to display information related to the device 100. The communication screen 136 may be configured to display one or more icons to communicate information related to the device 100. For example, the communication screen 136 may be configured to display a session progress indicator that may indicate a remaining length of the session to meet the session threshold. The remaining length of the session to meet the session threshold may be the minimum of a percentage of puffs remaining for the puff variable 312 to equal the puff threshold and a percentage of time remaining for the session time to equal the time threshold. The communication screen 136 may also be configured to display a session complete indicator that may indicate that the session threshold has been met and the session has ended.

The haptic actuator 308 may be a haptic motor that may be disposed within the housing 102 of the device 100. The haptic actuator 308 may be configured to vibrate the device when the haptic actuator 308 is actuated. The haptic actuator 308 may be configured to be actuated by the processor 302 at predetermined percentages of the remaining length of a session. In some embodiments, the haptic actuator 308 may be configured to actuate when the first flag 322 of the session control system 300 is set. For example, the haptic actuator 308 may be configured to actuate at the first threshold such as 20% of the session remaining to meet the session threshold. In some embodiments, there may be 20% of the session remaining when there is 20% of the puff threshold remaining, when there is 20% of the time threshold remaining, when there is 20% of the energy threshold remaining, or when there is 20% of the puff time threshold remaining. The haptic actuator 308 may additionally be configured to actuate when the second flag 324 of the session control system 300 is set. For example, the haptic actuator 308 may be configured to actuate when the second threshold is met such as when the session threshold is met, indicating that the session is complete. The session threshold may be met when the number of puffs as measured by the puff variable 312 is equal to the puff threshold, when the session time is equal to the time threshold, when the energy as measured by the energy meter 307 is equal to the energy threshold, or when the amount of time that air is flowing through the device 100 is equal to the puff time threshold. In some embodiments, the haptic actuator 308 may be configured to vibrate the device 100 in a vibration pattern when actuated.

The heating engine control 310 may be communicatively coupled with the heater 309 of the device 100. In some embodiments, the heating engine control 310 and the heater 309 may form a feedback loop with the energy meter 307. An output from the heater 309 may be a first input into the energy meter 307 and an output from the processor 302 may be a second input into the energy meter 307 such that the energy meter 307 receives both current and voltage measurements of the device 100 to measure an amount of energy used by the device 100 to power the heater 309. In some embodiments, the heating engine control 310 and the heater 309 may be elements of or may be coupled to one or more of a heating voltage measurement circuit, a heating current measurement circuit, and/or a compensation measurement circuit substantially as described in U.S. application Ser. No. 17/151,409 titled "HEAT-NOT-BURN (HNB) AEROSOL-GENERATING DEVICES INCLUDING INTRA-DRAW HEATER CONTROL, AND METHODS OF CONTROLLING A HEATER" filed on Jan. 18, 2021, the disclosure of which is incorporated herein in its entirety by reference.

The processor 302 may be configured to communicate with the heating engine control 310 to turn on the heater 309 when the control button 138 detects that the device 100 has been powered on. The processor 302 in conjunction with the heating engine control 310 may additionally be configured to turn off the heater 309 of the device 100 when the session threshold has been met and the session of the device 100 is complete.

The power supply 311 may be an internal power supply to supply power to the device 100 and the capsule 214. The supply of power from the power supply 311 may be controlled by the processor 302 through power control circuitry (not shown). The power control circuitry may include one or more switches or transistors to regulate power output from the power supply 311. The power supply 311 may be a Lithium-ion battery or a variant thereof (e.g., a Lithium-ion polymer battery).

Figure 4A:
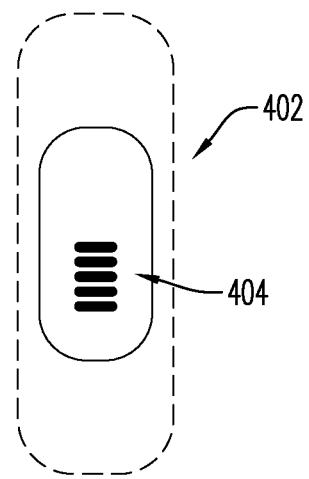
FIGS. 4A and 4B are different embodiments of icons that may be presented on a communication screen of the device.
Figure 4B:
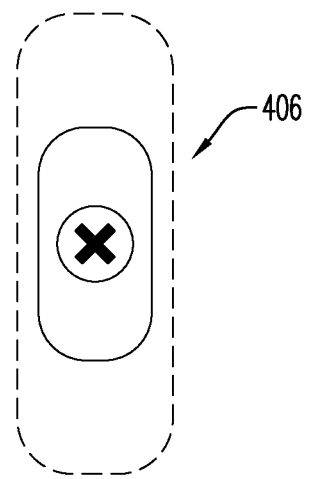

Referring to FIGS. 4A-4B, different example embodiments of display screens having a graphical user interface with an icon are shown. In some embodiments, the display screens may be the communication screen 136 of the device 100. The icons displayed on the display screen or the communication screen 136 may generally be referred to as system icons. In some embodiments, the icons of FIGS. 4A and 4B may be displayed on the communication screen 136 in a variety of colors, shade, or sizes. For example, the shaded areas of FIGS. 4A and 4B may be displayed as orange, teal, or red, or any other suitable color. The broken lines shown in FIGS. 4A and 4B illustrate a display screen or portions thereof. Additionally or alternatively, each of the icons of FIGS. 4A and 4B may be modified or adapted to be a different symbol or shape but each icon may represent a unique message about the device 100 and/or the session control system 300.

FIG. 4A shows a display screen having a graphical user interface with an icon such as a session progress icon or a session progress indicator 402. The session progress indicator 402 may be displayed on the communication screen 136 while a session of the device 100 is in progress. The session progress indicator 402 may be an oval that may be a capsule icon that may include a plurality of bars 404. In some embodiments, each bar of the plurality of bars 404 may represent a predetermined percentage of depletion of the consumable. For example, in some embodiments, there may be 10 bars where each bar represents a 10% depletion of the consumable. The session progress indicator 402 may be periodically updated while a session of the device 100 is in progress. For example, the session progress indicator 402 may be updated when the periodic timer 318 elapses. In some embodiments, the session threshold may be met when the consumable is depleted. Thus, the number of bars of the plurality of bars 404 displayed on the communication screen 136 may communicate a time remaining in the session to reach the session threshold.

FIG. 4B shows a display screen having a graphical user interface with an icon such as a capsule complete icon or a capsule complete indicator 406. The capsule complete indicator 406 may be displayed on the communication screen 136 once a session of the device 100 is complete. The session may be complete when the session threshold is met which may be when the capsule is completely depleted. In some embodiments, the capsule complete indicator 406 may be an oval that may be a capsule icon that may include an "X" in the center of the icon. In some embodiments, the capsule complete indicator 406 may be red in color.

Figure 5:
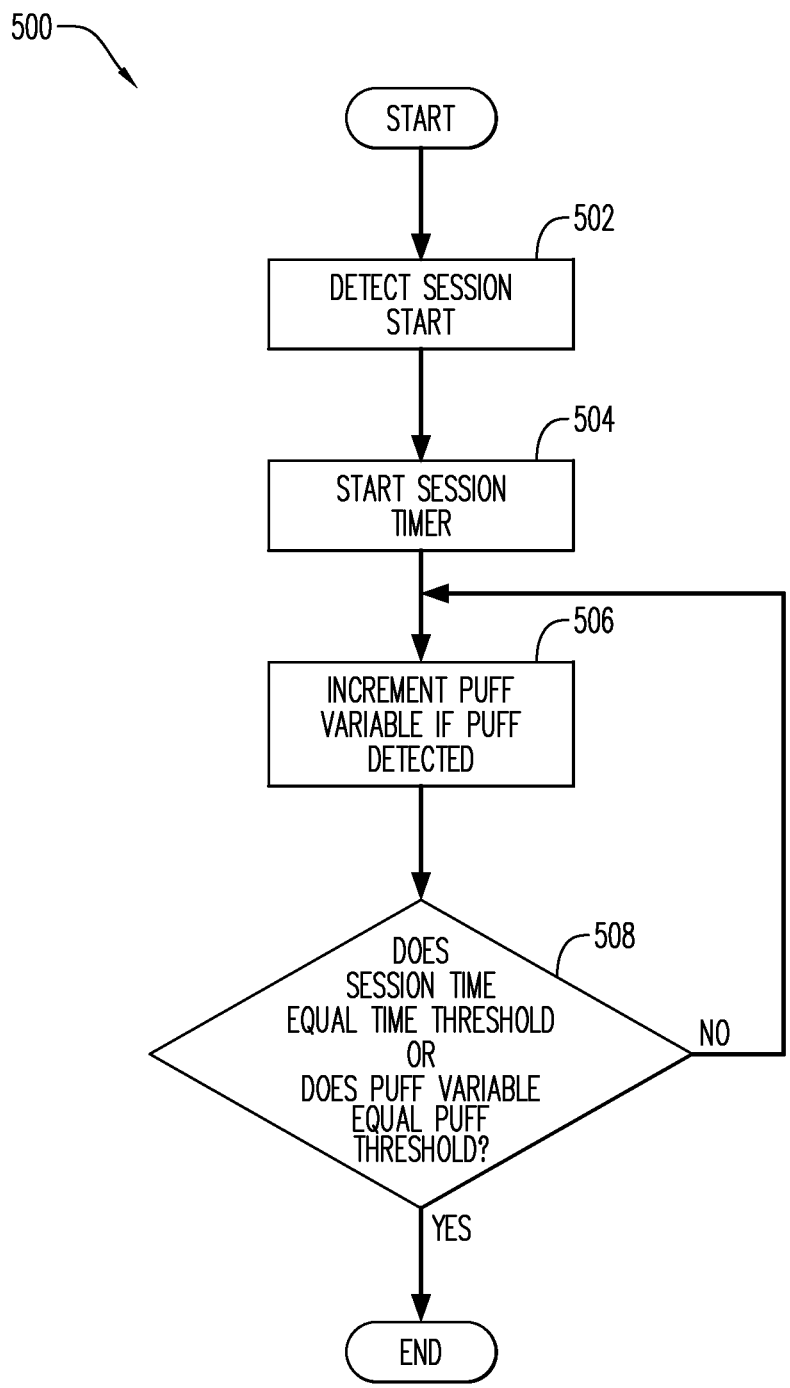
FIG. 5 is a block diagram of a method of operating the session control system of the device.

Referring to FIG. 5, a block diagram of a method 500 of operating the session control system 300 of the device 100 is shown. The processor 302 may start the method 500 once the control button 138 is pressed and the device 100 is powered on. The method 500 may then proceed to step 502 where the processor 302 may detect that a session has started. In some embodiments, a session may start when the control button 138 is pressed by a consumer to start a session. In other embodiments, a session may start when the heating engine control 310 and/or the processor 302 determines that the heater 309 of the device 100 is preheated.

Once the processor 302 of the session control system 300 detects that a session has started at the step 502, the method 500 may proceed to step 504 where the session timer 316 is started by the processor 302. The session timer 316 may be configured to measure the length of time of the session which may be a session time. Once the session timer 316 is started, the processor 302 of the session control system 300 may be configured to monitor the session time against the time threshold.

After the session timer 316 is started at the step 504, the method 500 may proceed to step 506 where the puff variable 312 is incremented by the processor 302 and/or the memory 304 if a puff is detected by the airflow sensor 306. Whether or not any puffs are detected, the session timer 316 will remain active if the session is ongoing. If a puff is detected by the airflow sensor 306 and/or the processor 302, the puff variable 312 may be incremented by the processor 302 and/or the memory 304.

The method 500 may proceed to conditional step 508 after the puff variable 312 is incremented if a puff is detected. At the conditional step 508 the processor 302 may determine whether either the session time, as measured by the session timer 316, is equal to the time threshold or whether the puff variable 312 is equal to the puff threshold.

If the session time, as measured by the session timer 316, is not equal to the time threshold and the puff variable 312 is not equal to the puff threshold, the method 500 may proceed down a "No" path back to the step 506 and may continue to increment the puff variable 312 if a puff is detected by the airflow sensor 306. Additionally, the session timer may continue to run until the session has ended.

If either the session time, as measured by the session timer 316, is equal to the time threshold or if the puff variable 312 is equal to the puff threshold, a session threshold has been met. Once the session threshold has been met, the session has ended and the method 500 may proceed down a "Yes" path to end. To end the session, the processor 302 may instruct the heating engine control 310 to turn off the heater 309 of the device 100 and the session timer 316 and the puff variable 312 may be reset such that they may be actuated when a new session is started.

Figure 6:
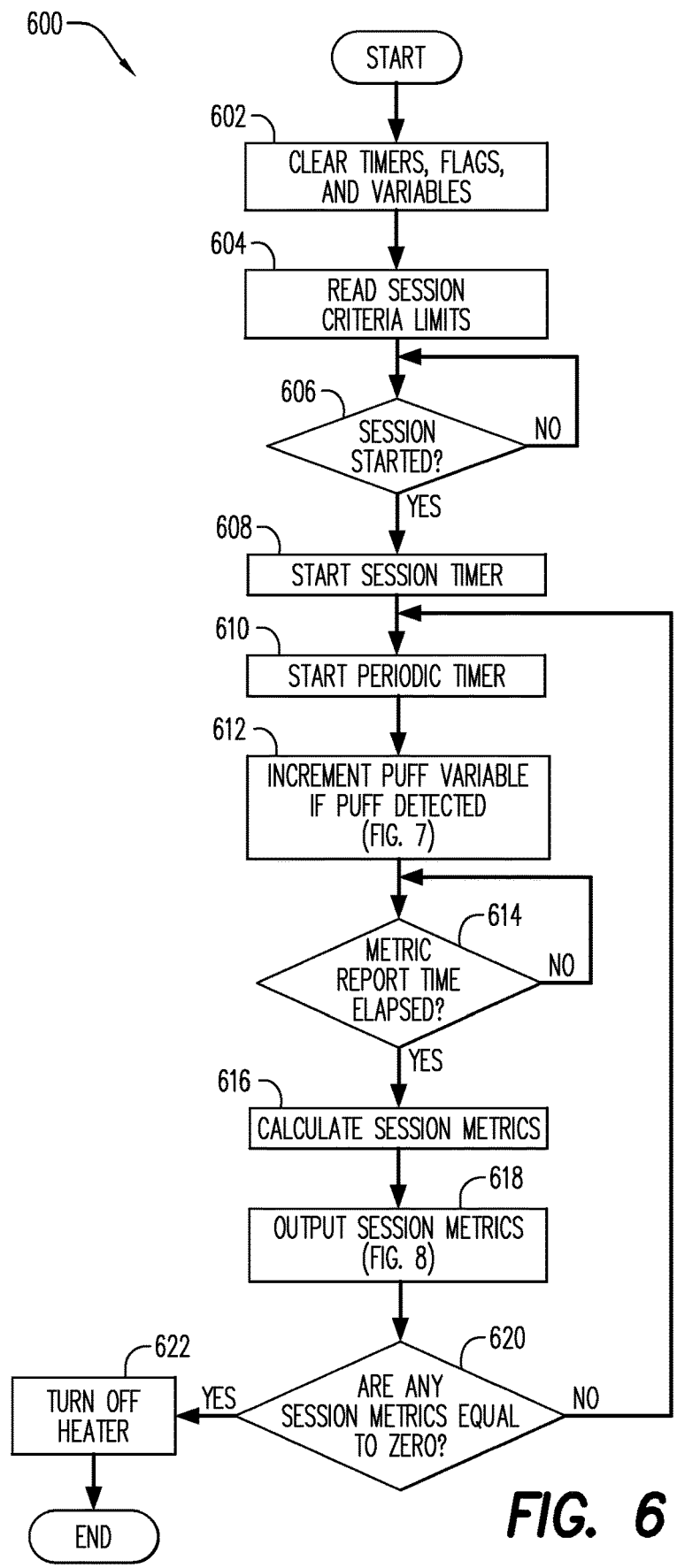
FIG. 6 is a block diagram of another method of operating the session control system of the device.

Referring to FIG. 6, a block diagram of a method 600 of operating the session control system 300 of the device 100 is shown. The method 600 may be more detailed than the method 500 as shown in FIG. 5. The method 600 may start when the device 100 is turned on by pressing the control button 138.

Once the device is on, the method 600 may proceed to step 602 where all timers, flags, and variables are cleared or set to their default values by the processor 302. In some embodiments, this may include resetting the puff variable 312, the first flag 322, the second flag 324, and each of the session timer 316, the periodic timer 318, and the hysteresis timer 320.

Once each of the variables, flags, and timers is reset or cleared, the method 600 may proceed to step 604 where the processor 302 of the session control system 300 reads session criteria limits. In some embodiments, the session control system 300 may read the session criteria limits from the memory 304. In some embodiments, the session criteria limits may be values for at least one of the puff threshold, the time threshold, the energy threshold, and the puff length threshold. In some embodiments, the session criteria limits may further include the metric report time, the hysteresis time, and the puff length threshold.

Once the session control system 300 reads the session criteria limits, the method 600 may proceed to conditional step 606 where the processor 302 of the session control system 300 determines whether a session has started. In some embodiments, a session may automatically be started when the device 100 is turned on. In other embodiments, the session may be started when the control button 138 is pressed by the consumer. In other embodiments, the session may start after each of the session criteria limits is processed by the session control system 300. The method 600 may proceed from the conditional step 606 after the session control system 300 determines that a session has started.

Once the session control system 300 has determined that a session has started, the method 600 may proceed to step 608. At the step 608, the session timer 316 is started by the processor. The session timer 316 may be configured to measure the session time. In some embodiments, the session timer 316 may only be started once the heating engine control 310 determines that the heater 309 of the device 100 is preheated. The device 100 may be preheated when the processor 302 determines that preheating has occurred based on at least one of a time threshold that the device 100 has been preheating for, an energy threshold reached by the device 100, and/or a temperature threshold reached by the device 100. This may ensure that the session time does not include any time that the device 100 is preheating since the consumable may not be available to the consumer while the device 100 is preheating.

After the session timer 316 is started, the method 600 may proceed to step 610 where the periodic timer 318 is started by the processor 302. In some embodiments, the periodic timer 318 may be started simultaneously with the session timer 316. The periodic timer 318 may be configured to measure the metric report time.

Once the periodic timer 318 is started, the method 600 may proceed to step 612. At the step 612, the puff variable 312 is incremented by the processor 302 and/or the memory 304 if a puff is detected. In some embodiments, the airflow sensor 306 may detect a puff through the device 100 and may be communicatively coupled with the puff variable 312. Additional details for incrementing the puff variable 312 are described below with reference to FIG. 7.

After the puff variable 312 is incremented if a puff is detected, the method 600 may proceed to conditional step 614. At the conditional step 614, the processor 302 may determine if the metric report time has elapsed. If the metric report time, as measured by the periodic timer 318, has not elapsed, the method 600 may proceed down a "No" path back to the conditional step 614. Once the metric report time of the periodic timer 318 has elapsed, the method 600 may proceed down a "Yes" path to step 616.

At the step 616, session metrics are calculated by the processor 302. In some embodiments, the session metrics may be a percentage of puffs remaining for the puff variable 312 to equal the puff threshold and a percentage of time remaining for the session time to equal the time threshold. Additionally or alternatively, the session metrics may include a percentage of energy remaining for the amount of energy used by the device 100 to power the heater 309 to equal the energy threshold and a percentage of time remaining for the total time of airflow through the device 100 to equal the puff time threshold.

Once the session metrics are calculated at the step 616, the method 600 may proceed to step 618 where the session metrics are output by the session control system 300. In some embodiments, the processor 302 may be configured to output the session metrics by displaying an icon or indication on the communication screen 136 and/or by actuating the haptic actuator 308 of the device 100. Additional information about outputting the session metrics is described below with reference to FIG. 8.

After the session metrics are output at the step 618, the method 600 may proceed to conditional step 620. At the conditional step 620, the processor 302 of the session control system 300 determines whether any of the session metrics are equal to zero. More specifically, the session control system 300 may determine whether the percentage of puffs remaining for the puff variable 312 to equal the puff threshold is equal to zero, whether the percentage of time remaining for the session time to equal the time threshold is equal to zero, whether the percentage of energy remaining for the amount of energy used by the device 100 to power the heater 309 to equal the energy threshold is equal to zero, or whether the percentage of time remaining for the total time of airflow through the device 100 to equal the puff time threshold is equal to zero.

If none of the session metrics are equal to zero, the method 600 may proceed down a "No" path to the step 610. At the step 610, the periodic timer 318 is restarted by the processor 302 and the method 600 continues as described above.

If any of the session metrics are equal to zero, the method 600 may proceed down a "Yes" path to the step 616 where the heater 309 is turned off. The heater 309 may be turned off by the heating engine control 310 after the heating engine control 310 has received a signal from the processor 302 indicating that the heater 309 should be turned off. Once the heater 309 is turned off, the session has ended and the processor 302 may end the method 600.

Figure 7:
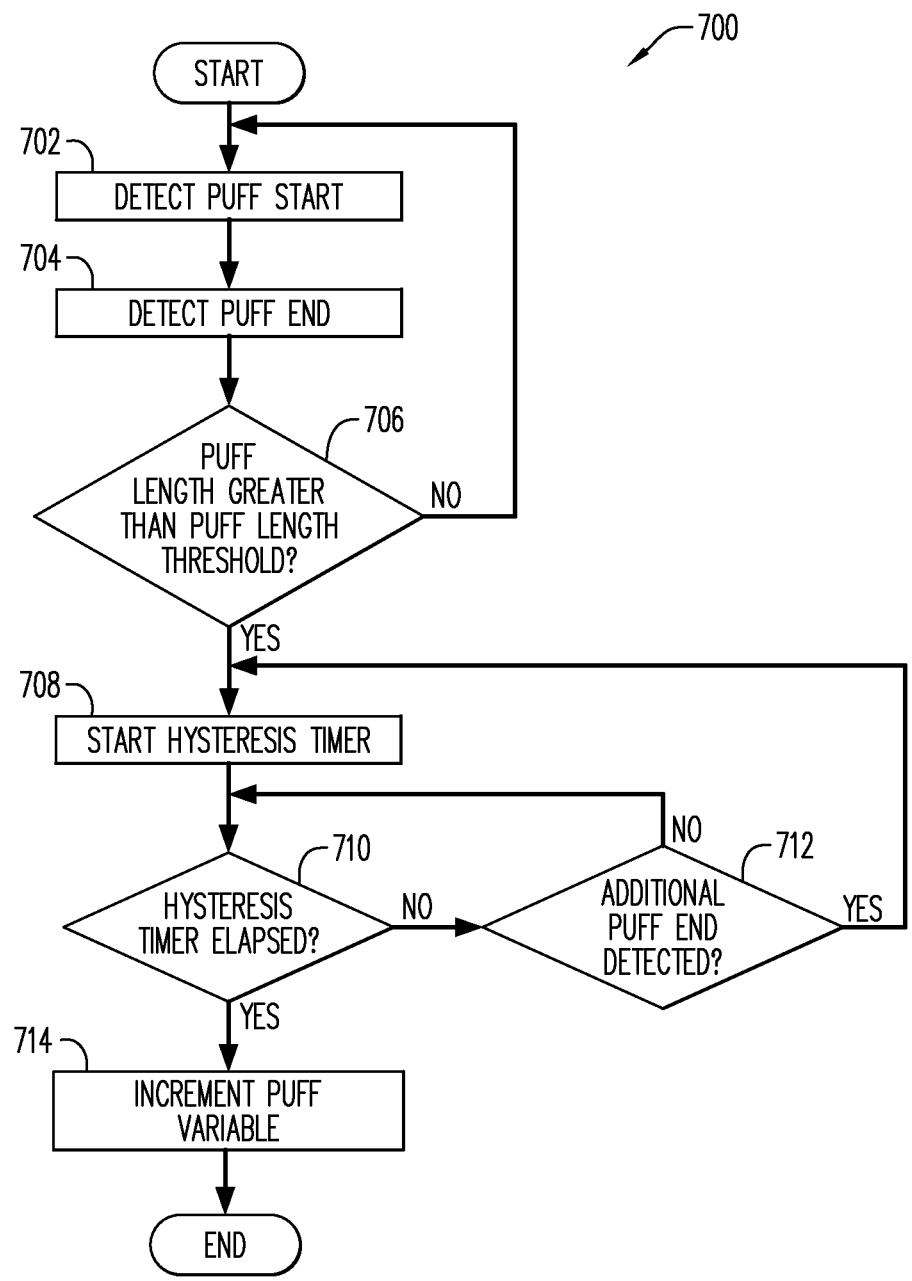
FIG. 7 is a block diagram of a method of incrementing a puff variable of the session control system.

Referring to FIG. 7, a block diagram of a method 700 of incrementing the puff variable 312 if a puff is detected of the step 612 of the method 600 is shown. The processor 302 may start the method 700 when the airflow sensor 306 detects a start of a puff at step 702. More specifically, the processor 302 may start the method 700 when the airflow sensor 306 determines that a consumer has begun applying a negative pressure through the mouthpiece 122 of the device 100 to detect the start of a puff. Once an end of a puff is detected, the method 700 may proceed to step 704.

At the step 704, the processor 302 may determine that a puff has ended. The processor 302 may determine that a puff has ended when the airflow sensor 306 determines that the consumer has stopped applying a negative pressure through the mouthpiece 122 of the device 100. Once the processor 302 has determined that a puff has ended, the method 700 may proceed to conditional step 706.

At the conditional step 706, the session control system 300 may determine whether a length of the puff that ended at the step 704 is greater than the puff length threshold. In some embodiments, the processor 302 may determine whether the length of the puff is greater than the puff length threshold. If the length of the puff is not greater than the puff length threshold, the method 700 may follow a "No" path back to the start of the method 700. The processor 302 may wait to execute the method 700 until the airflow sensor 306 detects another puff start. If the length of the puff is greater than the puff length threshold, the method 700 may proceed down a "Yes" path to step 708.

At the step 708, the processor 302 may start the hysteresis timer 320. The hysteresis timer 320 may measure a hysteresis time. In some embodiments, the hysteresis time may be two seconds. After the hysteresis timer 320 is started at the step 708, the method may proceed to conditional step 710.

At the conditional step 710, the processor 302 may determine whether the hysteresis time has elapsed. If the hysteresis time has not elapsed, the method 700 may proceed down a "No" path to conditional step 712. At the conditional step 712, the processor 302 may determine whether an additional puff end has been detected. If an additional puff end has not been detected, the method 700 may proceed down a "No" path back to the conditional step 710 and the processor 302 may determine whether the hysteresis timer 320 has elapsed. If the processor 302 does detect an additional puff end at the conditional step 712, the method 700 may proceed down a "Yes" path to the step 708 where the hysteresis timer 320 is started by the processor 302. In some embodiments, the hysteresis timer 320 may be restarted if the method 700 proceeds to the step 708 from the conditional step 712.

If the hysteresis timer 320 has elapsed at the conditional step 710, the method 700 may proceed to step 714. At the step 714, the puff variable 312 is incremented by the processor 302. After the puff variable 312 is incremented, the processor 302 may end the method 700 and may proceed to the conditional step 614 of the method 600. In some embodiments, the method 700 may be performed each time the airflow sensor 306 detects a puff by detecting airflow through the device 100.

Figure 8:
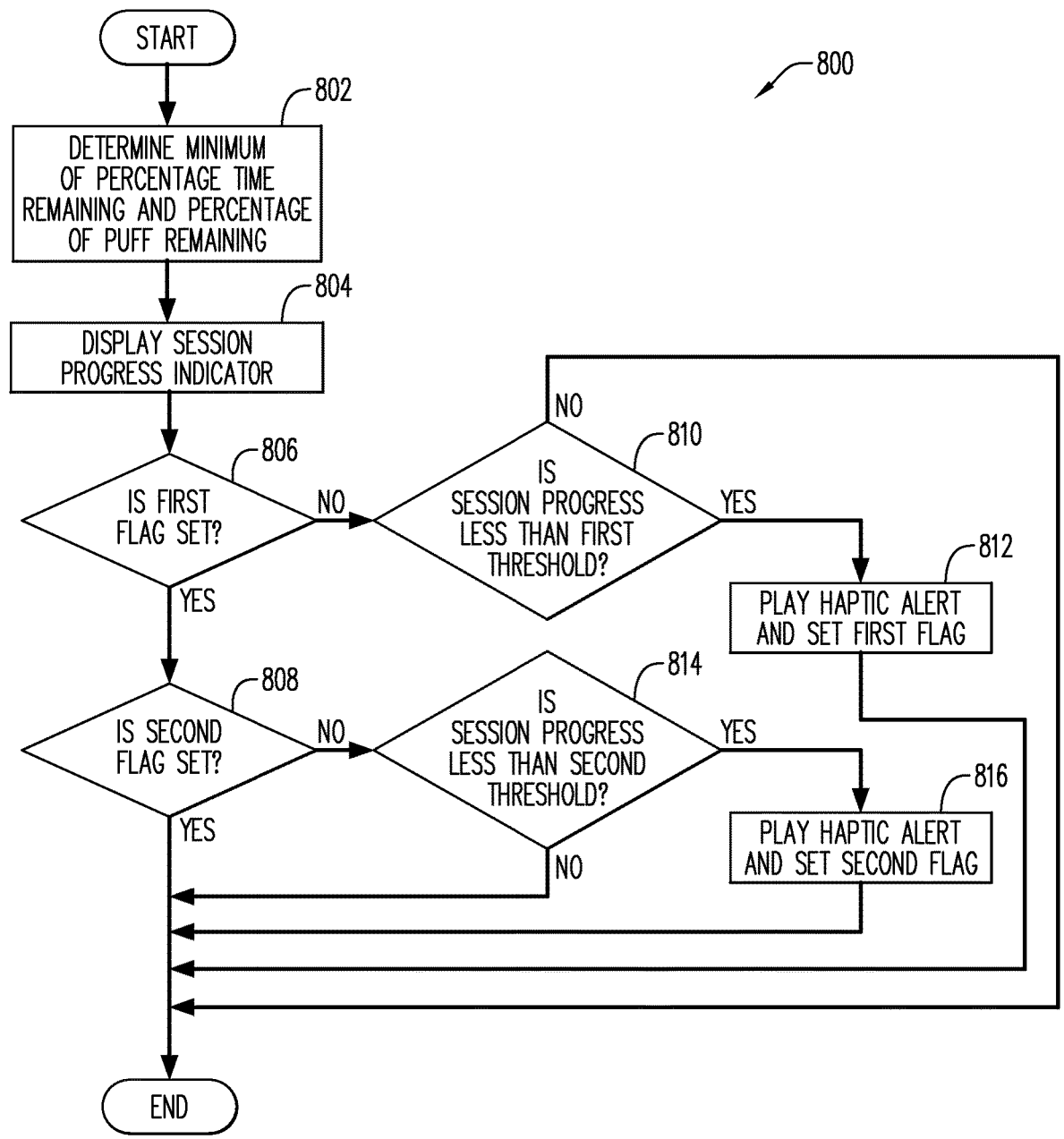
FIG. 8 is a block diagram of a method of actuating a haptic actuator of the session control system.

Referring to FIG. 8, a block diagram of a method 800 of outputting the session metrics of the step 618 of the method 600 is shown. The method 800 may begin at the step 618 of the method 600. In some embodiments, outputting the session metrics may include displaying an icon or indication on the communication screen 136 of the device 100 and/or actuating the haptic actuator 308 of the device 100. To determine what should be output by the device 100 to communicate the session metrics, the method 800 may proceed to step 802. At the step 802 the session control system 300 determines the minimum of the session metrics. This may be the minimum of the percentage of puffs remaining for the puff variable 312 to equal the puff threshold, the percentage of time remaining for the session time to equal the time threshold, the percentage of energy remaining for the amount of energy used by the device 100 to power the heater 309 to equal the energy threshold, and the percentage of time remaining for the total time of airflow through the device 100 to equal the puff time threshold. The minimum of the session metrics may be the session progress.

After the session progress is determined at the step 802, the method 800 may proceed to step 804 where the processor 302 displays the session progress on the communication screen 136. In some embodiments, the session progress may be output by displaying a message or an icon on the communication screen 136. For example, the session progress indicator 402 or the capsule complete indicator 406 may be displayed on the communication screen 136 by the processor 302.

After the session progress is output at the step 804, the method 800 may proceed to conditional step 806 where the session control system 300 determines if the first flag 322 is set. The memory 304 and/or the processor 302 may set the first flag 322 if the session progress was less than the first threshold at a previous iteration of the periodic timer 318. If the first flag 322 is set, the session progress may be less than the first threshold and the haptic actuator 308 may have previously vibrated the device 100 to indicate the session progress to a consumer. If the first flag 322 is set, the method 800 may proceed down a "Yes" path to conditional step 808.

At the conditional step 808, the session control system 300 determines if the second flag 324 is set. The second flag 324 may be set by the memory 304 and/or the processor 302 if the session progress was less than the second threshold at a previous iteration of the periodic timer 318. If the second flag 324 is set, the session progress may be less than the second threshold and the haptic actuator 308 may have previously vibrated the device 100 to indicate the session progress to a consumer. If the second flag 324 is set, the method 800 may proceed down a "Yes" path and the processor 302 may end the method 800.

If the first flag 322 is not set at the conditional step 806, the method 800 may proceed down a "No" path to conditional step 810. At the conditional step 810, the session control system 300 may determine whether the session progress is less than the first threshold. In some embodiments, the session progress may be less than the first threshold if any of the session metrics are less than the first threshold. If the session progress if not less than the first threshold, the method 800 may proceed down a "No" path and the processor 302 may end the method 800.

If the session progress is less than the first threshold, the method 800 may proceed down a "Yes" path to step 812. At the step 812, the memory 304 and/or the processor 302 of the session control system 300 may set the first flag 322 and may play a haptic alert. In some embodiments, playing the haptic alert may include the processor 302 actuating the haptic actuator 308 of the device 100. After the first flag 322 is set and the haptic alert is played at the step 812, the processor 302 may end the method 800.

Referring again to the conditional step 808, if the second flag 324 is not set, the method 800 may proceed down a "No" path to conditional step 814. At the conditional step 814, the session control system 300 may determine whether the session progress is less than the second threshold. In some embodiments, the session progress may be less than the second threshold if any of the session metrics are less than the second threshold. If the session progress if not less than the second threshold, the method 800 may proceed down a "No" path and the processor 302 may end the method 800.

If the session progress is less than the second threshold, the method 800 may proceed down a "Yes" path to step 816. At the step 816, the processor 302 and/or the memory 304 of the session control system 300 may set the second flag 324 and may play a haptic alert. In some embodiments, the haptic alert played when the second flag 324 is set may be distinct from the haptic alert that is played when the first flag 322 is set. As discussed above, playing the haptic alert may include actuating the haptic actuator 308 of the device 100. After the second flag 324 is set and the haptic alert is played at the step 816, processor 302 may end the method 800.

When the processor 302 ends the method 800 in any of the paths discussed above, the step 618 of outputting the session metrics of the method 600 may be complete and the method 600 may proceed to the conditional step 620 as discussed above with reference to FIG. 6.

Figure 9:
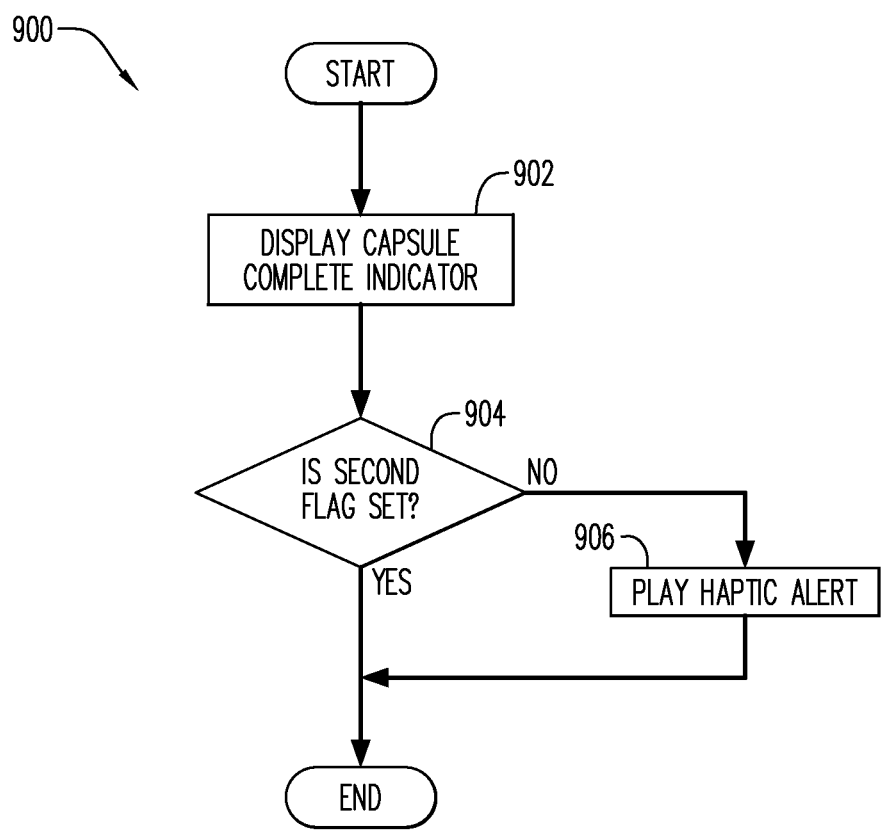
FIG. 9 is a block diagram of a method of ending a session of the device.

Referring to FIG. 9, a block diagram of a method 900 of ending a session is shown. In some embodiments, the method 900 may represent a method of ending a session when any of the session metrics are not equal to zero. This may occur when the device 100 has been adjusted in a way that immediately ends a session. For example, if the lid 104 is opened, the processor 302 may end any ongoing session of the device 100. Additionally, the processor 302 may prevent the haptic actuator 308 from playing a haptic alert twice if any of the session metrics equal zero simultaneously.

The processor 302 may start the method 900 when a session end message is received by the session control system 300. When the session end message is received by the session control system 300, the heater 309 of the device 100 may be turned off by the heating engine control 310. As described above, the session end message may be received when none of the session metrics are equal to zero but the session has ended by another action such as opening the lid 104 of the device 100. After the method 900 starts, it may proceed to step 902 where the capsule complete indicator 406 is displayed on the communication screen 136 by the processor 302. The capsule complete indicator 406 may be used to communicate to the consumer that the session has ended.

Once the capsule complete indicator 406 is displayed at the step 902, the method 900 may proceed to conditional step 904. At the conditional step 904, the processor 302 and/or the memory 304 may determine whether the second flag 324 is set. If the second flag 324 is not set, the method 900 may proceed down a "No" path to step 906 where a haptic alert is played by the processor 302 actuating the haptic actuator 308 of the device 100. If the second flag 324 is set, the method 900 may proceed down a "Yes" path and the processor 302 may end the method 900.

The processor 302 may ensure that the haptic actuator 308 does not play the haptic alert more than the desired number of times. For example, if the haptic actuator 308 had already been actuated to play the haptic alert when the second flag 324 was previously set, the processor 302 may ensure that the haptic actuator 308 does not actuate again.

Figure 10:
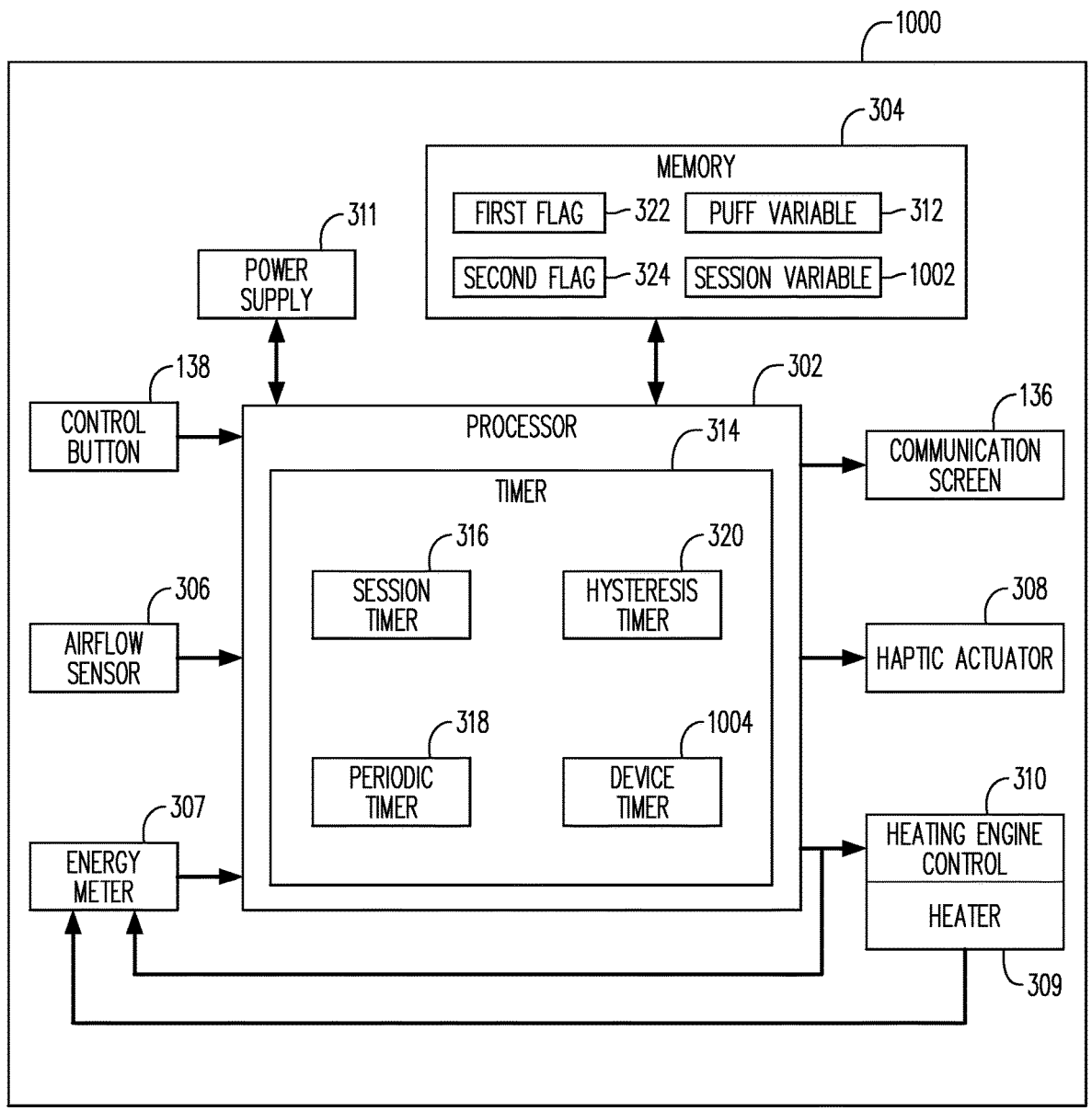
FIG. 10 is a block diagram of a multi-session control system of the device according to an example embodiment.

Referring to FIG. 10, a block diagram of a multi-session control system 1000 of the device 100 according to an example embodiment is shown. The multi-session control system 1000 may be configured to monitor progress of the device 100 over multiple sessions. The multi-session control system 1000 may also be configured to power off the device when a device threshold is met. In some embodiments, the multi-session control system 1000 may monitor one or more criteria to determine the progress of the device 100 and to determine when the device threshold is met. A first criteria may be a number of puffs taken. A second criteria may be an elapsed time that may be a device time. A third criteria may be an energy consumed by the device 100. A fourth criteria may be an amount of time that air is flowing through the device 100 from puffs taken by a consumer. A fifth criteria may be a number of sessions of the device 100. The device threshold may be met when either the number of puffs taken equals a puff threshold, when the device time equals a time threshold, when the amount of energy used by the device 100 to power the heater 309 equals an energy threshold, when the amount of time that air is flowing through the device from puffs taken by a consumer equals a puff time threshold, or when the number of sessions of the device 100 equals a session threshold. In some embodiments, any of the above criteria may be monitored alone or in combination to determine when the device threshold has been met.

When the progress of the device 100 is considered complete, the multi-session control system 1000 may power off the device 100. In some embodiments, the multi-session control system 1000 may further be configured to communicate the progress of the device 100 to a consumer via the communication screen 136 or another output method of the device 100.

The multi-session control system 1000 may include the processor 302, the memory 304, the control button 138, the airflow sensor 306, the energy meter 307, the haptic actuator 308, and the heating engine control 310 described above with reference to FIG. 3. In some embodiments, the processor 302 may include the timer 314 and the memory 304 may include the puff variable 312, the first flag 322, the second flag 324, and a session variable 1002. The timer 314 may include one or more timers configured to measure one or more times related to the device 100 and/or the multi-session control system 1000. The timer 314 may include the session timer 316, the periodic timer 318, the hysteresis timer 320, and a device timer 1004. The processor 302 may communicate with the memory 304, the control button 138, the airflow sensor 306, the energy meter 307, the haptic actuator 308, the heating engine control 310, the puff variable 312, the timer 314, the first flag 322, the second flag 324, and the session variable 1002.

The processor 302, the memory 304, the control button 138, the airflow sensor 306, the energy meter 307, the haptic actuator 308, the heating engine control 310, the puff variable 312, the first flag 322, the second flag 324, the session timer 316, the periodic timer 318, and the hysteresis timer 320 are described above with reference to FIG. 3 and function as described above.

The session variable 1002 may be a counter that may be set to zero when the device is powered on. The memory 304 may increment the session variable 1002 by one each time that a new session is started. In some embodiments, the multi-session control system 1000 may determine when a session has started and ended as described above with reference to FIG. 6.

The timer 314 may include the device timer 1004 that may be configured to measure a device time. The device time may be a total amount of time that a session is active while the device 100 is on. The device threshold may be met when the device time equals the time threshold.

Figure 11:
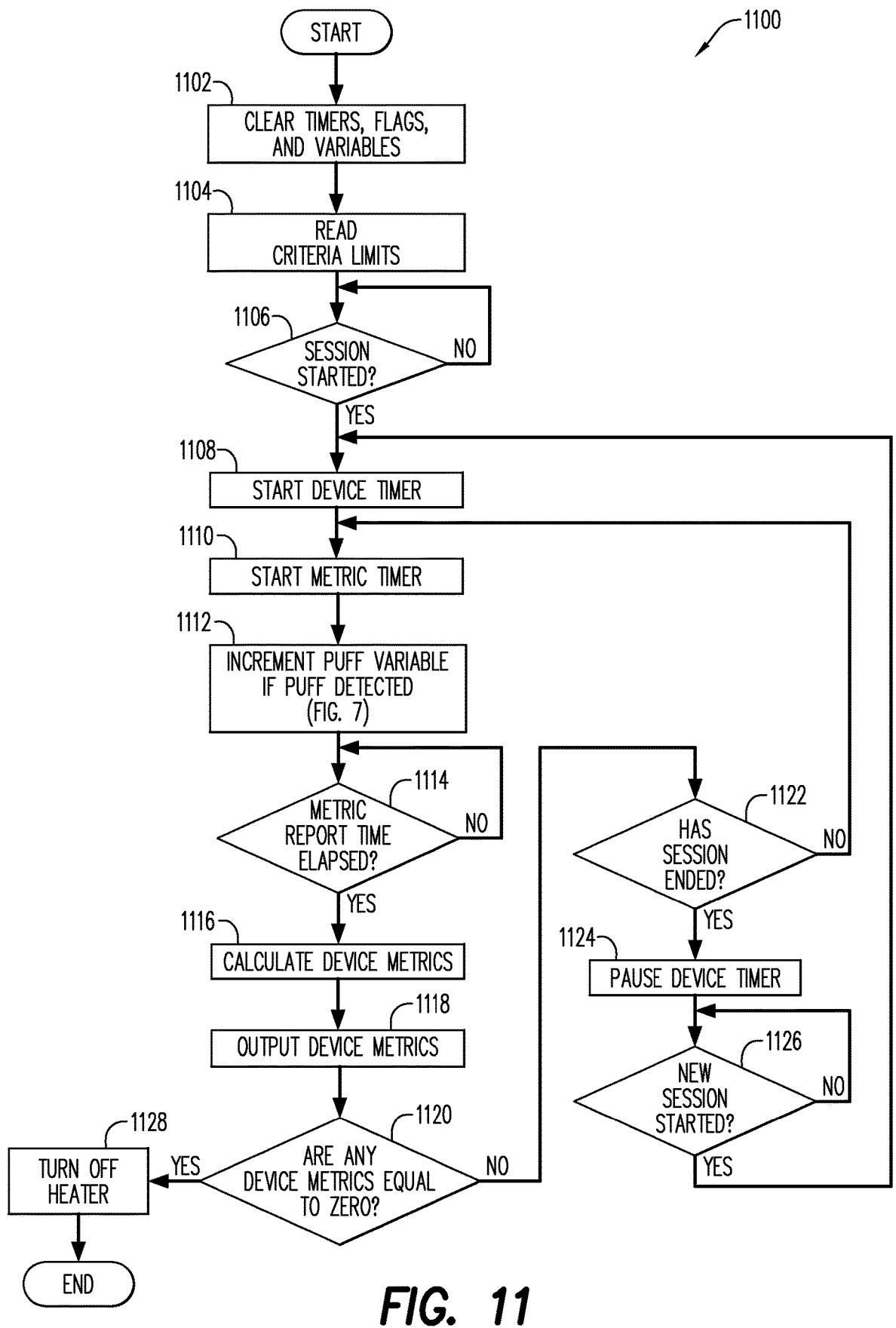
FIG. 11 is a block diagram of a method of operating the multi-session control system of the device.

Referring to FIG. 11, a block diagram of a method 1100 of operating the multi-session control system 1000 of the device 100 is shown. The processor 302 may start the method 1100 when the device 100 is turned on by pressing the control button 138.

Once the device is on, the method 1100 may proceed to step 1102 where the memory 304 and/or the processor 302 clear or set to a default setting all timers, flags, and variables. In some embodiments, this may include resetting the puff variable 312, the session variable 1002, the first flag 322, the second flag 324, and each of the session timer 316, the periodic timer 318, the hysteresis timer 320, and the device timer 1004.

Once each of the variables, flags, and timers is reset or cleared, the method 1100 may proceed to step 1104 where the multi-session control system 1000 reads criteria limits. In some embodiments, the processor 302 may read the criteria limits from the memory 304. In some embodiments, the criteria limits may be values for at least one of the puff threshold, the time threshold, the energy threshold, the puff length threshold, and the session threshold. In some embodiments, the session criteria limits may further include the metric report time, the hysteresis time, and the puff length threshold.

Once the multi-session control system 1000 reads the criteria limits, the method 1100 may proceed to conditional step 1106 where the processor 302 of the multi-session control system 1000 determines whether a session has started. In some embodiments, the processor 302 may be configured to start a session when the device 100 is turned on. In other embodiments, the processor 302 may start the session when the control button 138 is pressed by the consumer. In other embodiments, the session may start after each of the criteria limits is processed by the multi-session control system 1000. The method 1100 may proceed from the conditional step 1106 after the multi-session control system 1000 determines that a session has started.

Once the multi-session control system 1000 has determined that a session has started, the method 1100 may proceed to step 1108. At the step 1108, the device timer 1004 is started by the processor 302. The device timer 1004 may be configured to measure the device time. In some embodiments, the device timer 1004 may only be started once the heating engine control 310 determines that the heater 309 of the device 100 is preheated. This may ensure that the device time does not include any time that the device 100 is preheating since the consumable may not be available to the consumer while the device 100 is preheating.

After the device timer 1004 is started, the method 1100 may proceed to step 1110 where the periodic timer 318 is started by the processor 302. In some embodiments, the periodic timer 318 may be started simultaneously with the device timer 1004. The periodic timer 318 may be configured to measure the metric report time.

Once the periodic timer 318 is started, the method 1100 may proceed to step 1112. At the step 1112, the puff variable 312 is incremented by the memory 304 and/or the processor 302 if a puff is detected. In some embodiments, the airflow sensor 306 may detect a puff through the device 100 and may be communicatively coupled with the puff variable 312 via the processor 302. Additional details for incrementing the puff variable 312 are described above with reference to FIG. 7.

After the puff variable 312 is incremented by the memory 304 and/or the processor 302 if a puff is detected, the method 1100 may proceed to conditional step 1114. At the conditional step 1114, the method 1100 may determine if the metric report time has elapsed. If the metric report time, as measured by the periodic timer 318, has not elapsed, the method 1100 may proceed down a "No" path back to the conditional step 1114. Once the metric report time of the periodic timer 318 has elapsed, the method 1100 may proceed down a "Yes" path to step 1116.

At the step 1116, device metrics are calculated by the processor 302. In some embodiments, the device metrics may be a percentage of puffs remaining for the puff variable 312 to equal the puff threshold and a percentage of time remaining for the device time to equal the time threshold. Additionally or alternatively, the device metrics may include a percentage of energy remaining for the amount of energy used by the device 100 to power the heater 309 to equal the energy threshold, a percentage of time remaining for the total time of airflow through the device 100 to equal the puff time threshold, and/or a percentage of sessions remaining for the session variable 1002 to equal the session threshold.

Once the device metrics are calculated at the step 1116 by the processor 302, the method 1100 may proceed to step 1118 where the device metrics are output by the multi-session control system 1000. In some embodiments, the processor 302 may be configured to communicate with the communication screen 136 and/or the haptic actuator 308 to output the device metrics as an icon or indication on the communication screen 136 and/or as a vibration pattern of the haptic actuator 308 of the device 100. In some embodiments, the session progress indicator 402 and/or the capsule complete indicator 406 may be displayed based on the device progress similar to the session progress outputs as discussed above with respect to FIGS. 4A-4B.

After the device metrics are output by the processor 302 at the step 1118, the method 1100 may proceed to conditional step 1120. At the conditional step 1120, the processor 302 of the multi-session control system 1000 determines whether any of the device metrics are equal to zero. More specifically, the multi-session control system 1000 may determine whether the percentage of puffs remaining for the puff variable 312 to equal the puff threshold is equal to zero, whether the percentage of time remaining for the device time to equal the time threshold is equal to zero, whether the percentage of energy remaining for the amount of energy used by the device 100 to power the heater 309 to equal the energy threshold is equal to zero, whether the percentage of time remaining for the total time of airflow through the device 100 to equal the puff time threshold is equal to zero, or whether the percentage of sessions remaining for the session variable 1002 to equal the session threshold is equal to zero.

If none of the device metrics are equal to zero, the method 600 may proceed down a "No" path to conditional step 1122. At the conditional step 1122, the processor 302 of the multi-session control system 1000 may determine whether a session has ended. As discussed above, the multi-session control system 1000 may determine whether a session has ended by following the steps of the method 600. If the session has not ended, the method 1100 may proceed down a "No" path to the step 1110 where the metric timer is restarted by the processor 302. If the session has ended, the method 1100 may proceed down a "Yes" path to step 1124. At the step 1124, the device timer 1004 may be paused by the processor 302.

After the device timer 1004 is paused at the step 1124, the method 1100 may proceed to conditional step 1126. At the conditional step 1126, the processor 302 may determine whether a new session has started. If a new session has not started, the method 1100 may proceed down a "No" path back to the conditional step 1126. Once the processor 302 has determined that a new session has started, the method 1100 may proceed down a "Yes" path to the step 1108 where the device timer 1004 is restarted by the processor 302. The device timer 1004 is not reset but rather restarted after it was paused at the step 1124. In some embodiments, the device timer 1004 may not be restarted until the heater 309 of the device 100 is fully preheated.

Referring again to the conditional step 1120, if any of the device metrics are equal to zero, the method 1100 may proceed down a "Yes" path to step 1128 where the heater 309 is turned off. The heater 309 may be turned off by the heating engine control 310. Once the heater 309 is turned off, the device is turned off by the processor 302 to end the method 1100.

The systems, apparatuses, and methods described herein may provide significant advantages. The session control system 300 and the multi-session control system 1000 may provide a way to communicate a session and a device status to a consumer. For example, the session control system 300 may provide an indication to a consumer of when an ongoing session may end and the multi-session control system 1000 may provide an indication to a consumer of when the device 100 will be powered off after potentially several sessions of use. Both the session control system 300 and the multi-session control system 1000 may monitor several criteria of the device 100 to give a consumer an accurate idea of the status of the session and/or the device 100. Additionally, the session control system 300 and the multi-session control system 1000 may be configured to power off the heater 309 of the device 100 when specified thresholds are met. This may provide a more consistent experience for the consumer because the session length may be informed by usage of the device 100.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A session control system for a device, the session control system comprising:
   at least one processor; and
   a memory coupled to the at least one processor and storing instructions,
   wherein the at least one processor is configured to execute the instructions to cause the session control system to,
      detect when a session has started,
      start a session timer, the session timer being configured to measure a length of the session,
      start a periodic timer simultaneously with the session timer, the periodic timer being configured to measure a metric report time and being configured to be restarted upon the metric report time elapsing,
      increment a puff variable when an airflow sensor detects that a puff has been taken, the puff variable corresponding to a total number of puffs taken,
      monitor the session timer against a time threshold and the puff variable against a puff threshold,
      display a session progress indicator on a consumer interface of the device, the session progress indicator corresponding to a length of the session remaining to meet a session threshold,
      update the session progress indicator each time the metric report time elapses, and
      in response to the session threshold being met, end the session.

2. The session control system of claim 1, wherein the session threshold is met when the puff variable equals the puff threshold.

3. The session control system of claim 2, wherein the puff threshold is 20 puffs taken.

4. The session control system of claim 1, wherein the session threshold is met when the length of the session equals the time threshold.

5. The session control system of claim 4, wherein the time threshold is 7 minutes.

6. The session control system of claim 1, wherein the session is started when a control button is actuated and the device begins to preheat.

7. The session control system of claim 1, wherein the session timer is started when the device is preheated.

8. The session control system of claim 1, wherein the length of the session remaining to meet the session threshold is a lower of a percentage of a time remaining for the session timer to equal the time threshold and a percentage of a number of puffs remaining for the puff variable to equal the puff threshold.

9. The session control system of claim 1, wherein the at least one processor is configured to execute the instructions to cause the session control system to display a session complete indicator when the session threshold is met.

10. The session control system of claim 1, wherein the at least one processor is configured to execute the instructions to cause the session control system to actuate a haptic actuator at 20% of the session remaining to meet the session threshold and when the session threshold is met.

11. The session control system of claim 1, wherein the metric report time is ten seconds.

12. The session control system of claim 1, wherein the at least one processor is configured to execute the instructions to cause the session control system to generate a metric report when the periodic timer elapses, the metric report containing a percentage of a time remaining for the session timer to equal the time threshold and a percentage of a number of puffs remaining for the puff variable to equal the puff threshold.

13. The session control system of claim 1, wherein the detecting that a puff has been taken comprises:
   detecting, with the airflow sensor, airflow through the device;
   measuring a length of time of the airflow through the device;
   determining if the length of time of the airflow through the device is greater than a puff length threshold; and
   incrementing the puff variable if the length of time of the airflow through the device is greater than the puff length threshold.

14. The session control system of claim 13, wherein the puff length threshold is 350 milliseconds.

15. The session control system of claim 13, wherein detecting that a puff has been taken further comprises:
   starting a hysteresis timer if the length of time of the airflow through the device is greater than the puff length threshold;

restarting the hysteresis timer if the airflow sensor detects additional airflow through the device prior to the hysteresis timer elapsing; and
incrementing the puff variable when the hysteresis timer elapses.

16. The session control system of claim 15, wherein the hysteresis timer is 2 seconds.

17. The session control system of claim 1, wherein the monitoring the session timer against the time threshold and the puff variable against the puff threshold comprises:
setting a first flag to indicate that either a percentage of the time threshold remaining or a percentage of the puff threshold remaining is equal to 20%; and
setting a second flag to indicate that either a percentage of the time threshold remaining or a percentage of the puff threshold remaining is equal to 0%.

18. The session control system of claim 17, wherein the monitoring the session timer against the time threshold and the puff variable against the puff threshold further comprises:
actuating a haptic actuator of the device when the first flag is set; and
actuating the haptic actuator when the second flag is set.

19. The session control system of claim 1, wherein the at least one processor is configured to execute the instructions to cause the session control system to:
calculate an amount of energy used by the device for heating; and
monitor the amount of energy used by the device for heating against an energy threshold.

20. The session control system of claim 19, wherein the session threshold is met when the amount of energy used by the device equals the energy threshold.

21. The session control system of claim 1, wherein the at least one processor is configured to execute the instructions to cause the session control system to:
track an amount of time when airflow is flowing through the device from puffs taken; and
monitor the amount of time when airflow is flowing through the device from puffs taken against a puff time threshold.

22. The session control system of claim 21, wherein the session threshold is met when the amount of time when airflow is flowing through the device from puffs taken equals the puff time threshold.

23. The session control system of claim 1, wherein the session progress indicator is a capsule icon that includes a plurality of bars, each bar of the plurality of bars representing a percentage of the session threshold.

24. A multi-session control system for a device, the multi-session control system comprising:
at least one processor; and
a memory coupled to the at least one processor and storing instructions,
wherein the at least one processor is configured to execute the instructions to cause the multi-session control system to,
detect when a session has started,
start a device timer, the device timer being configured to measure a total use time of the device,
start a periodic timer simultaneously with the device timer, the device timer being configured to measure a metric report time and being configured to be restarted upon the metric report time elapsing,
increment a puff variable when an airflow sensor detects that a puff has been taken, the puff variable corresponding to a total number of puffs taken,
monitor the device timer against a time threshold and the puff variable against a puff threshold,
display a session progress indicator on a consumer interface of the device, the session progress indicator corresponding to a length of the session remaining to meet a device threshold,
update the session progress indicator each time the metric report time elapses,
detect that the session has ended before the device threshold is met,
pause the device timer when the session has ended,
detect when a new session has started,
restart the device timer when the device is preheated after the new session has started, the device timer restarting from a time when the device timer was paused, and
in response to the device threshold being met, power off the device.

* * * * *